(12) United States Patent
Zhamu et al.

(10) Patent No.: US 9,597,657 B1
(45) Date of Patent: Mar. 21, 2017

(54) CHEMICAL-FREE PRODUCTION OF 3D GRAPHENE-CARBON HYBRID FOAM

(71) Applicants: Aruna Zhamu, Springboro, OH (US); Bor Z Jang, Centerville, OH (US)

(72) Inventors: Aruna Zhamu, Springboro, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 0 days.

(21) Appl. No.: 14/998,357

(22) Filed: Dec. 28, 2015

(51) Int. Cl.
| | | |
|---|---|---|
| *C01B 31/00* | (2006.01) | |
| *C01B 31/04* | (2006.01) | |
| *B01J 20/20* | (2006.01) | |
| *B01J 20/28* | (2006.01) | |
| *B01J 20/30* | (2006.01) | |
| *C09K 3/32* | (2006.01) | |
| *C09K 5/14* | (2006.01) | |

(52) U.S. Cl.
CPC ........ *B01J 20/20* (2013.01); *B01J 20/28045* (2013.01); *B01J 20/3078* (2013.01); *C01B 31/04* (2013.01); *C09K 3/32* (2013.01); *C09K 5/14* (2013.01)

(58) Field of Classification Search
CPC .. B01J 20/20; B01J 20/28045; B01J 20/3078; C01B 31/04; C09K 3/32; C09K 5/14
USPC .................................. 423/448; 264/29.1–29.7
See application file for complete search history.

(56) References Cited

U.S. PATENT DOCUMENTS

| | | |
|---|---|---|
| 6,872,330 B2 | 3/2005 | Mack et al. |
| 7,071,258 B1 | 7/2006 | Jang et al. |
| 7,327,000 B2 | 2/2008 | DeHeer et al. |
| 7,824,651 B2 | 11/2010 | Zhamu et al. |

*Primary Examiner* — Daniel C McCracken

(57) ABSTRACT

Provided is a method of producing an integral 3D graphene-carbon hybrid foam, comprising: (a) mixing multiple particles of a graphitic material and multiple particles of a solid polymer carrier material to form a mixture in an impacting chamber of an energy impacting apparatus; (b) operating the energy impacting apparatus to peel off graphene sheets from the graphitic material and transferring the graphene sheets to surfaces of solid polymer carrier material particles to produce graphene-coated polymer particles; (c) recovering the graphene-coated polymer particles from the impacting chamber and consolidating the graphene-coated polymer particles into a desired shape of graphene-polymer composite structure; and (d) pyrolyzing the shape of graphene-polymer composite structure to thermally convert the polymer into carbon or graphite that bonds the graphene sheets to form the integral 3D graphene-carbon hybrid foam.

20 Claims, 13 Drawing Sheets

CHEMICAL-FREE PRODUCTION OF 3D GRAPHENE-CARBON HYBRID FOAM

FIELD OF THE INVENTION

The present invention relates generally to the field of carbon/graphite foams and, more particularly, to a new form of porous graphitic material herein referred to as an integral 3D graphene-carbon hybrid foam and a process for producing same.

BACKGROUND OF THE INVENTION

Carbon is known to have five unique crystalline structures, including diamond, fullerene (0-D nano graphitic material), carbon nano-tube or carbon nano-fiber (1-D nano graphitic material), graphene (2-D nano graphitic material), and graphite (3-D graphitic material). The carbon nano-tube (CNT) refers to a tubular structure grown with a single wall or multi-wall. Carbon nano-tubes (CNTs) and carbon nano-fibers (CNFs) have a diameter on the order of a few nanometers to a few hundred nanometers. Their longitudinal, hollow structures impart unique mechanical, electrical and chemical properties to the material. The CNT or CNF is a one-dimensional nano carbon or 1-D nano graphite material.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Four main prior-art approaches have been followed to produce NGPs. Their advantages and shortcomings are briefly summarized as follows:

A Review on Production of Isolated Nano Graphene Plates or Sheets (NGPs)

Approach 1: Chemical Formation and Reduction of Graphene Oxide (GO)

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d = \frac{1}{2} d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.
(2) The chemical treatment process requires a long intercalation and oxidation time, typically 5 hours to five days.
(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.

(4) The thermal exfoliation requires a high temperature (typically 800-1,200° C.) and, hence, is a highly energy-intensive process.

(5) Both heat- and solution-induced exfoliation approaches require a very tedious washing and purification step. For instance, typically 2.5 kg of water is used to wash and recover 1 gram of GIC, producing huge quantities of waste water that need to be properly treated.

(6) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to overcome the limitations or problems outlined above.

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs. The present invention was made to overcome the limitations outlined above.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications. The present invention was made to overcome the limitations outlined above.

Another process for producing graphene, in a thin film form (typically <2 nm in thickness), is the catalytic chemical vapor deposition process. This catalytic CVD involves catalytic decomposition of hydrocarbon gas (e.g. $C_2H_4$) on Ni or Cu surface to form single-layer or few-layer graphene. With Ni or Cu being the catalyst, carbon atoms obtained via decomposition of hydrocarbon gas molecules at a temperature of 800-1,000° C. are directly deposited onto Cu foil surface or precipitated out to the surface of a Ni foil from a Ni—C solid solution state to form a sheet of single-layer or few-layer graphene (less than 5 layers). The Ni- or Cu-catalyzed CVD process does not lend itself to the deposition of more than 5 graphene planes (typically <2 nm) beyond which the underlying Ni or Cu layer can no longer provide any catalytic effect. The CVD graphene films are extremely expensive.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets. The present invention was made to overcome the limitations outlined above.

Hence, an urgent need exists to have a graphene production process that requires a reduced amount of undesirable chemical (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and damaged), more electrically conductive, and larger/wider graphene sheets. Furthermore, one should be able to readily make these graphene sheets into a foam structure.

Our recent research has yielded a process for chemical-free production of isolated nano graphene platelets that is novel in that is does not follow the established methods for production of nano graphene platelets outlined above. In addition, the process is of enhanced utility in that it is cost effective, and provided novel graphene materials with significantly reduced environmental impact. Furthermore, as herein disclosed, we have combined the chemical-free production of graphene and the formation of a graphene-carbon hybrid form into one single operation.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene-carbon foam can contain pristine or non-pristine graphene and the invented method allows for this flexibility.

A Review on Production of Graphene Foams

Generally speaking, a foam or foamed material is composed of pores (or cells) and pore walls (a solid material). The pores can be interconnected to form an open-cell foam. A graphene foam is composed of pores and pore walls that contain a graphene material. There are three major methods of producing graphene foams:

The first method is the hydrothermal reduction of graphene oxide hydrogel that typically involves sealing graphene oxide (GO) aqueous suspension in a high-pressure autoclave and heating the GO suspension under a high pressure (tens or hundreds of atm) at a temperature typically in the range of 180-300° C. for an extended period of time (typically 12-36 hours). A useful reference for this method is given here: Y. Xu, et al. "Self-Assembled Graphene Hydrogel via a One-Step Hydrothermal Process," ACS Nano 2010, 4, 4324-4330. There are several major issues associated with this method: (a) The high pressure requirement makes it an impractical method for industrial-scale production. For one thing, this process cannot be conducted on a continuous basis. (b) It is difficult, if not impossible, to exercise control over the pore size and the porosity level of the resulting porous structure. (c) There is no flexibility in terms of varying the shape and size of the resulting reduced graphene oxide (RGO) material (e.g. it cannot be made into a film shape). (d) The method involves the use of an ultra-low concentration of GO suspended in water (e.g. 2 mg/mL=2 g/L=2 kg/kL). With the removal of non-carbon elements (up to 50%), one can only produce less than 2 kg of graphene material (RGO) per 1000-liter suspension. Furthermore, it is practically impossible to operate a 1000-liter reactor that has to withstand the conditions of a high temperature and a high pressure. Clearly, this is not a scalable process for mass production of porous graphene structures.

The second method is based on a template-assisted catalytic CVD process, which involves CVD deposition of graphene on a sacrificial template (e.g. Ni foam). The graphene material conforms to the shape and dimensions of the Ni foam structure. The Ni foam is then etched away using an etching agent, leaving behind a monolith of graphene skeleton that is essentially an open-cell foam. A useful reference for this method is given here: Zongping Chen, et al., "Three-dimensional flexible and conductive interconnected graphene networks grown by chemical vapour deposition," Nature Materials, 10 (June 2011) 424-428. There are several problems associated with such a process: (a) the catalytic CVD is intrinsically a very slow, highly energy-intensive, and expensive process; (b) the etching agent is typically a highly undesirable chemical and the resulting Ni-containing etching solution is a source of pollution. It is very difficult and expensive to recover or recycle the dissolved Ni metal from the etchant solution. (c) It is challenging to maintain the shape and dimensions of the graphene foam without damaging the cell walls when the Ni foam is being etched away. The resulting graphene foam is typically very brittle and fragile. (d) The transport of the CVD precursor gas (e.g. hydrocarbon) into the interior of a metal foam can be difficult, resulting in a non-uniform structure, since certain spots inside the sacrificial metal foam may not be accessible to the CVD precursor gas.

The third method of producing graphene foam also makes use of a sacrificial material (e.g. colloidal polystyrene particles, PS) that is coated with graphene oxide sheets using a self-assembly approach. For instance, Choi, et al. prepared chemically modified graphene (CMG) paper in two steps: fabrication of free-standing PS/CMG films by vacuum filtration of a mixed aqueous colloidal suspension of CMG and PS (2.0 μm PS spheres), followed by removal of PS beads to generate 3D macro-pores. [B. G. Choi, et al., "3D Macroporous Graphene Frameworks for Supercapacitors with High Energy and Power Densities," ACS Nano, 6 (2012) 4020-4028.] Choi, et al. fabricated well-ordered free-standing PS/CMG paper by filtration, which began with separately preparing a negatively charged CMG colloidal and a positively charged PS suspension. A mixture of CMG colloidal and PS suspension was dispersed in solution under controlled pH (=2), where the two compounds had the same surface charges (zeta potential values of +13±2.4 mV for CMG and +68±5.6 mV for PS). When the pH was raised to 6, CMGs (zeta potential=−29±3.7 mV) and PS spheres (zeta potential=+51±2.5 mV) were assembled due to the electrostatic interactions and hydrophobic characteristics between them, and these were subsequently integrated into PS/CMG composite paper through a filtering process. This method also has several shortcomings: (a) This method requires very tedious chemical treatments of both graphene oxide and PS particles. (b) The removal of PS by toluene also leads to weakened macro-porous structures. (c) Toluene is a highly regulated chemical and must be treated with extreme caution. (d) The pore sizes are typically excessively big (e.g. several μm), too big for many useful applications.

The above discussion clearly indicates that every prior art method or process for producing graphene foams has major deficiencies. Thus, it is an object of the present invention to provide a cost-effective process for producing highly conductive, mechanically robust graphene-based foams (specifically, integral 3D graphene-carbon hybrid foam) in large quantities. This process does not involve the use of an environmentally unfriendly chemical. This process enables the flexible design and control of the porosity level and pore sizes.

It is another object of the present invention to provide a process for producing graphene-carbon hybrid foams that exhibit a thermal conductivity, electrical conductivity, elastic modulus, and/or strength that are comparable to or greater than those of the conventional graphite or carbon foams.

Yet another object of the present invention is to provide (a) a pristine graphene-based hybrid foam that contains essentially all carbon only and preferably have a meso-scaled pore size range (2-50 nm); and (b) non-pristine graphene foams (graphene fluoride, graphene chloride, nitrogenated graphene, etc.) that contains at least 0.001% by weight (typically from 0.01% to 25% by weight and most typically from 0.1% to 20%) of non-carbon elements that can be used for a broad array of applications.

Another object of the present invention is to provide products (e.g. devices) that contain a graphene-carbon foam of the present invention and methods of operating these products.

SUMMARY OF THE INVENTION

The present invention provides a method of producing an integral 3D graphene-carbon hybrid foam directly from particles of a graphitic material and particles of a polymer. This method is stunningly simple. The method comprises:

(a) mixing multiple particles of a graphitic material and multiple particles of a solid polymer carrier material to form a mixture in an impacting chamber of an energy impacting apparatus;

(b) operating this energy impacting apparatus with a frequency and an intensity for a length of time sufficient for peeling off graphene sheets from the graphitic material and transferring the graphene sheets to surfaces of the solid polymer carrier material particles to produce graphene-coated or graphene-embedded polymer particles inside the impacting chamber; (e.g. The impacting apparatus, when in operation, imparts kinetic energy to polymer particles, which in turn impinge upon graphite particle surfaces/edges and peel off graphene sheets from the impacted graphite particles. These peeled-off graphene sheets stick to surfaces of these polymer particles. This is herein referred to as the "direct transfer" process, meaning that graphene sheets are directly transferred from graphite particles to surfaces of polymer particles without being mediated by any third-party entity.)

(c) recovering the graphene-coated or graphene-embedded polymer particles from the impacting chamber and consolidating the graphene-coated or graphene-embedded polymer particles into a desired shape of graphene-polymer hybrid structure (this consolidating step can be as simple as a compacting step that just packs graphene-coated or embedded particles into a desired shape); and (d) pyrolyzing this shape of graphene-polymer hybrid structure to thermally convert the polymer into pores and carbon or graphite that bonds the graphene sheets to form the integral 3D graphene-carbon hybrid foam.

In certain alternative embodiments, a plurality of impacting balls or media are added to the impacting chamber of the energy impacting apparatus. These impacting balls, accelerated by the impacting apparatus, impact the surfaces/edges of graphite particles and peel off graphene sheets therefrom. These graphene sheets are tentatively transferred to surfaces of these impacting balls. These graphene-supporting impacting balls subsequently impinge upon polymer particles and transfer the supported graphene sheets to the surfaces of these polymer particles. This sequence of events is herein referred to as the "indirect transfer" process. In some embodiments of the indirect transfer process, step (c) includes operating a magnet to separate the impacting balls or media from the graphene-coated or graphene-embedded polymer particles.

The solid polymer material particles can include plastic or rubber beads, pellets, spheres, wires, fibers, filaments, discs, ribbons, or rods, having a diameter or thickness from 10 nm to 10 mm. Preferably, the diameter or thickness is from 100 nm to 1 mm, and more preferably from 200 nm to 200 µm. The solid polymer may be selected from solid particles of a thermoplastic, thermoset resin, rubber, semi-penetrating network polymer, penetrating network polymer, natural polymer, or a combination thereof. In an embodiment, the solid polymer is partially removed by melting, etching, or dissolving in a solvent prior to step (d).

In certain embodiments, the graphitic material is selected from natural graphite, synthetic graphite, highly oriented pyrolytic graphite, graphite fiber, graphitic nano-fiber, graphite fluoride, oxidized graphite, chemically modified graphite, exfoliated graphite, recompressed exfoliated graphite, expanded graphite, meso-carbon micro-bead, or a combination thereof. Preferably, the graphitic material contains a non-intercalated and non-oxidized graphitic material that has never been previously exposed to a chemical or oxidation treatment prior to the mixing step (a).

We have surprisingly observed that a broad array of impacting devices can be used for practicing the instant invention. For instance, the energy impacting apparatus can be a vibratory ball mill, planetary ball mill, high energy mill, basket mill, agitator ball mill, cryo ball mill, micro ball mill, tumbler ball mill, continuous ball mill, stirred ball mill, pressurized ball mill, freezer mill, vibratory sieve, bead mill, nano bead mill, ultrasonic homogenizer mill, centrifugal planetary mixer, vacuum ball mill, or resonant acoustic mixer.

For the formation of the carbon component of the resulting graphene-carbon hybrid foam, one can choose polymer particles that have a high carbon yield or char yield (e.g. >30% by weight). The carbon yield is the weight percentage of a polymer structure that is converted by heat to a solid carbon phase, instead of becoming part of a volatile gas. The high carbon-yield polymer may be selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof.

If a lower carbon content (higher graphene proportion) is desired in the graphene-carbon hybrid foam, the polymer can contain a low carbon-yield polymer selected from polyethylene, polypropylene, polybutylene, polyvinyl chloride, polycarbonate, acrylonitrile-butadiene (ABS), polyester, polyvinyl alcohol, poly vinylidiene fluoride (PVDF), polytetrafluoroethylene (PTFE), polyphenylene oxide (PPO), poly methyl methacrylate (PMMA), a copolymer thereof, a polymer blend thereof, or a combination thereof It may be noted that these polymers (both high and low carbon yields), when heated at a temperature of 300-2,500° C., are converted into a carbon material, which is preferentially nucleated near graphene sheet edges. Such a carbon material serves to bridge the gaps between graphene sheets, forming interconnected electron-conducting pathways. In other words, the resulting graphene-carbon hybrid foam is composed of integral 3D network of carbon-bonded graphene sheets, allowing continuous transport of electrons and phonons (quantized lattice vibrations) between graphene sheets or domains without interruptions. When further heated at a temperature higher than 2,500° C., the graphene-bonding carbon phase can get graphitized provided that the carbon phase is "soft carbon" or graphitizable. In such a situation, both the electric conductivity and thermal conductivity are further increased.

Thus, in certain embodiments, the step of pyrolyzing includes carbonizing the polymer at a temperature from 200° C. to 2,500° C. to obtain carbon-bonded graphene sheets. Optionally, the carbon-bonded graphene sheets can be subsequently graphitized at a temperature from 2,500° C. to 3,200° C. to obtain graphite-bonded graphene sheets.

It may be noted that pyrolyzation of a polymer tends to lead to the formation of pores in the resulting polymeric carbon phase due to the evolution of those volatile gas molecules such as $CO_2$ and $H_2O$. However, such pores also have a high tendency to get collapsed if the polymer is not constrained when being carbonized. We have surprisingly discovered that the graphene sheets wrapped around a polymer particle are capable of constraining the carbon pore walls from being shrunk and collapsed, while some carbon species also permeate to the gaps between graphene sheets where these species bond the graphene sheets together. The pore sizes and pore volume (porosity level) of the resulting 3D integral graphene foam depend upon the starting polymer size and the carbon yield of the polymer and, to a lesser extent, on the pyrolyzation temperature.

In certain preferred embodiments, the consolidating step includes compacting a mass of these graphene-coated polymer particles into a desired shape. For instance, by squeezing and compressing the mass of graphene-coated particles into a mold cavity one can readily form a compact green body. One can rapidly heat and melt the polymer, slightly compress the green body to slightly fuse the polymer particles together by heat, and rapidly cool to solidify the body. This consolidated body is then subjected to a pyrolysis treatment (polymer carbonization and, optionally, graphitization).

In some alternative embodiments, the consolidating step includes melting the polymer particles to form a polymer melt mixture with graphene sheets dispersed therein, forming the polymer melt mixture into a desired shape and solidifying the shape into a graphene-polymer composite structure. Such shape can be a rod, film (thin or thick film, wide or narrow, single sheets or in a roll), fiber (short filament or continuous long filament), plate, ingot, any regular shape or odd shape. This graphene-polymer composite shape is then pyrolyzed Alternatively, the consolidating step may include dissolving the polymer particles in a solvent to form a polymer solution mixture with graphene sheets dispersed therein, forming the polymer solution mixture into a desired shape, and removing the solvent to solidify the shape into the graphene-polymer composite structure. This composite structure is then pyrolyzed to form a porous structure.

The consolidating step may include melting the polymer particles to form a polymer melt mixture with graphene sheets dispersed therein and extruding the mixture into a rod form or sheet form, spinning the mixture into a fiber form, spraying the mixture into a powder form, or casting the mixture into an ingot form.

In some embodiments, the consolidating step includes dissolving the polymer particles in a solvent to form a polymer solution mixture with graphene sheets dispersed therein and extruding the solution mixture into a rod form or sheet form, spinning the solution mixture into a fiber form, spraying the solution mixture into a powder form, or casting the solution mixture into an ingot form, and removing the solvent.

In a specific embodiment, the polymer solution mixture is sprayed to create a graphene-polymer composite coating or film, which is then pyrolyzed (carbonized or carbonized and graphitized).

Preferably, the consolidating step may include compacting the graphene-coated polymer particles in a porous green compact having macroscopic pores and then infiltrate or impregnate the pores with an additional carbon source material selected from a petroleum pitch, coal tar pitch, an aromatic organic material (e.g. naphthalene or other derivatives of a pitch), a monomer, an organic polymer, or a combination thereof. The organic polymer may contain a high carbon-yield polymer selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof. When the infiltrated green compact of graphene-coated polymer particles is subjected to pyrolyzation, these species become additional sources of carbon, if a higher amount of carbon in the hybrid foam is desired.

The present invention also provides an integral 3D graphene-carbon hybrid foam composed of multiple pores and pore walls, wherein the pore walls contain single-layer or few-layer graphene sheets chemically bonded by a carbon material having a carbon material-to-graphene weight ratio from 1/200 to 1/2, wherein the few-layer graphene sheets have 2-10 layers of stacked graphene planes having an inter-plane spacing $d_{002}$ from 0.3354 nm to 0.36 nm as measured by X-ray diffraction and the single-layer or few-layer graphene sheets contain a pristine graphene material having essentially zero % of non-carbon elements, or a non-pristine graphene material having 0.001% to 35% by weight (preferably 0.01% to 25%) of non-carbon elements wherein the non-pristine graphene is selected from graphene oxide, reduced graphene oxide, graphene fluoride, graphene chloride, graphene bromide, graphene iodide, hydrogenated graphene, nitrogenated graphene, chemically functionalized graphene, or a combination thereof. A plurality of single-layer or few layer graphene embracing the underlying polymer particles can overlap with one another to form a stack of graphene sheets. The stack can have a thickness greater than 5 nm and, in some cases, greater than 10 nm or even greater than 100 nm.

The integral 3D graphene-carbon hybrid foam typically has a density from 0.001 to 1.7 g/cm$^3$, and a specific surface area from 50 to 3,000 m$^2$/g. In a preferred embodiment, the pore walls contain stacked graphene planes having an inter-planar spacing $d_{002}$ from 0.3354 nm to 0.40 nm as measured by X-ray diffraction.

For oil recovery applications (e.g. separating oil from water), the graphene-carbon preferably has an oxygen content from 1% to 25% by weight (more preferably 1-15% and most preferably 1-10%). This can be achieved if the starting material is oxidized graphite, or if the carbonization treatment is conducted in a lightly oxidizing environment at a temperature of 300-1,500° C. (preferably no greater than 1,000° C.) and no subsequent graphitization is conducted. We have surprisingly discovered that a highly porous graphene-carbon foam of this nature is capable of absorbing oil from an oil-water mixture up to 500% of its own weight.

For thermal management applications, the graphene-carbon hybrid foam is preferably made by subjecting the carbon-bonded graphene sheets (after carbonization) to a graphitization treatment under a compressive stress. This facilitates orientation and re-organization (merging, growth, etc.) of graphene sheets or graphene domains. As a result, the graphene-carbon foam sheet or film exhibits a thermal conductivity of at least 200 W/mK per unit of specific gravity, and/or an electrical conductivity no less than 2,000 S/cm per unit of specific gravity.

In an embodiment, the pore walls contain pristine graphene and the 3D solid graphene-carbon foam has a density from 0.001 to 1.7 g/cm$^3$ or an average pore size from 2 nm to 50 nm. In an embodiment, the pore walls contain a non-pristine graphene material selected from the group consisting of graphene oxide, reduced graphene oxide, graphene fluoride, graphene chloride, graphene bromide, graphene iodide, hydrogenated graphene, nitrogenated graphene, chemically functionalized graphene, and combinations thereof, and wherein the solid graphene foam contains a content of non-carbon elements in the range of 0.01% to 20% by weight. In other words, the non-carbon elements can include an element selected from oxygen, fluorine, chlorine, bromine, iodine, nitrogen, hydrogen, or boron. In a specific embodiment, the pore walls contain graphene fluoride and the solid graphene foam contains a fluorine content from 0.01% to 20% by weight. In another embodiment, the pore walls contain graphene oxide and said solid graphene foam contains an oxygen content from 0.01% to 20% by weight. In an embodiment, the solid graphene-carbon hybrid foam has a specific surface area from 200 to 2,000 $m^2/g$ or a density from 0.01 to 1.5 $g/cm^3$.

It may be noted that there are no limitations on the shape or dimensions of the presently invented graphene-carbon hybrid foam. In a preferred embodiment, the solid graphene-carbon hybrid foam is made into a continuous-length roll sheet form (a roll of a continuous foam sheet) having a thickness no less than 100 nm and no greater than 10 cm and a length of at least 1 meter long, preferably at least 2 meters, further preferably at least 10 meters, and most preferably at least 100 meters. This sheet roll is produced by a roll-to-roll process. There has been no prior art graphene-based foam that is made into a sheet roll form. It has not been previously found or suggested possible to have a roll-to-roll process for producing a continuous length of graphene foam, either pristine or non-pristine based.

For thermal management or electrical conductivity-based applications, the graphene-carbon foam preferably has an oxygen content or non-carbon content less than 1% by weight, and the pore walls have stacked graphene planes having an inter-graphene spacing less than 0.35 nm, a thermal conductivity of at least 250 W/mK per unit of specific gravity, and/or an electrical conductivity no less than 2,500 S/cm per unit of specific gravity.

In a further preferred embodiment, the graphene-carbon hybrid foam has an oxygen content or non-carbon content less than 0.01% by weight and said pore walls contain stacked graphene planes having an inter-graphene spacing less than 0.34 nm, a thermal conductivity of at least 300 W/mK per unit of specific gravity, and/or an electrical conductivity no less than 3,000 S/cm per unit of specific gravity.

In yet another preferred embodiment, the graphene-carbon hybrid foam has an oxygen content or non-carbon content no greater than 0.01% by weight and said pore walls contain stacked graphene planes having an inter-graphene spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity.

In still another preferred embodiment, the graphene foam has pore walls containing stacked graphene planes having an inter-graphene spacing less than 0.336 nm, a mosaic spread value no greater than 0.4, a thermal conductivity greater than 400 W/mK per unit of specific gravity, and/or an electrical conductivity greater than 4,000 S/cm per unit of specific gravity.

In a preferred embodiment, the pore walls contain stacked graphene planes having an inter-graphene spacing less than 0.337 nm and a mosaic spread value less than 1.0. In a preferred embodiment, the graphene foam exhibits a degree of graphitization no less than 80% (preferably no less than 90%) and/or a mosaic spread value less than 0.4. In a preferred embodiment, the pore walls contain a 3D network of interconnected graphene planes.

In a preferred embodiment, the solid graphene-carbon hybrid foam contains meso-scaled pores having a pore size from 2 nm to 50 nm. The solid graphene foam can also be made to contain micron-scaled pores (1-500 µm).

The present invention also provides an oil-removing or oil-separating device, which contains the presently invented 3D graphene-carbon hybrid foam as an oil-absorbing element. Also provided is a solvent-removing or solvent-separating device containing the 3D graphene-carbon hybrid foam as a solvent-absorbing element.

The invention also provides a method to separate oil from an oil-water mixture (e.g. oil-spilled water or waste water from oil sand). The method comprises the steps of (a) providing an oil-absorbing element comprising an integral graphene-carbon hybrid foam; (b) contacting an oil-water mixture with the element, which absorbs the oil from the mixture; and (c) retreating the element from the mixture and extracting the oil from the element. Preferably, the method comprises a further step of (d) reusing the element.

Additionally, the invention provides a method to separate an organic solvent from a solvent-water mixture or from a multiple-solvent mixture. The method comprises the steps of (a) providing an organic solvent-absorbing element comprising an integral graphene-carbon hybrid foam; (b) bringing the element in contact with an organic solvent-water mixture or a multiple-solvent mixture containing a first solvent and at least a second solvent; (c) allowing this element to absorb the organic solvent from the mixture or absorb the first solvent from the at least second solvent; and (d) retreating the element from the mixture and extracting the organic solvent or first solvent from the element. Preferably, the method contains an additional step (e) of reusing the element.

DESCRIPTION OF THE PREFERRED EMBODIMENTS

The present invention provides a method of producing an integral 3D graphene-carbon hybrid foam directly from particles of a graphitic material and particles of a polymer.

Figure 1:
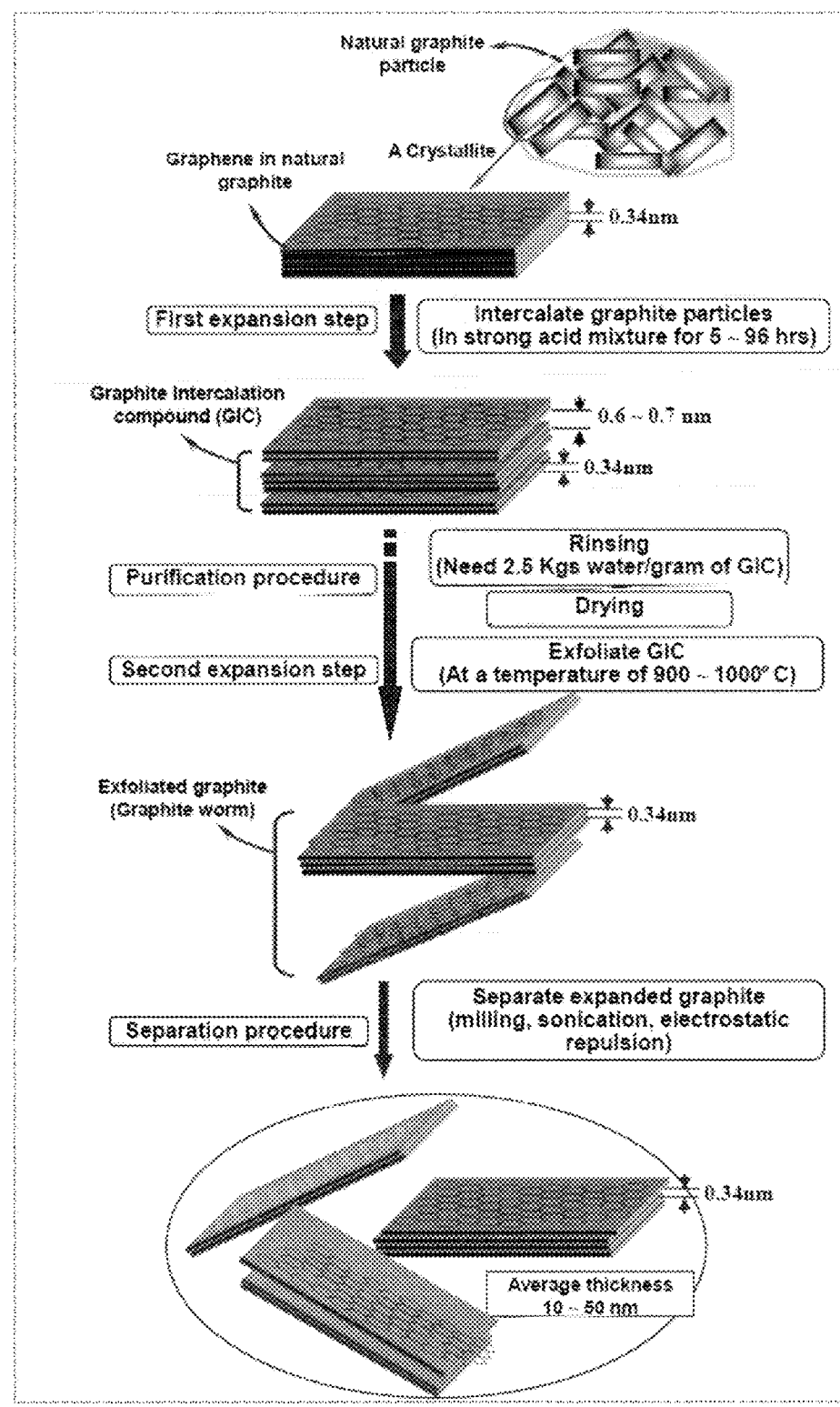
FIG. 1 A flow chart showing the most commonly used prior art process of producing highly oxidized NGPs that entails tedious chemical oxidation/intercalation, rinsing, and high-temperature exfoliation procedures.
Figure 2A:
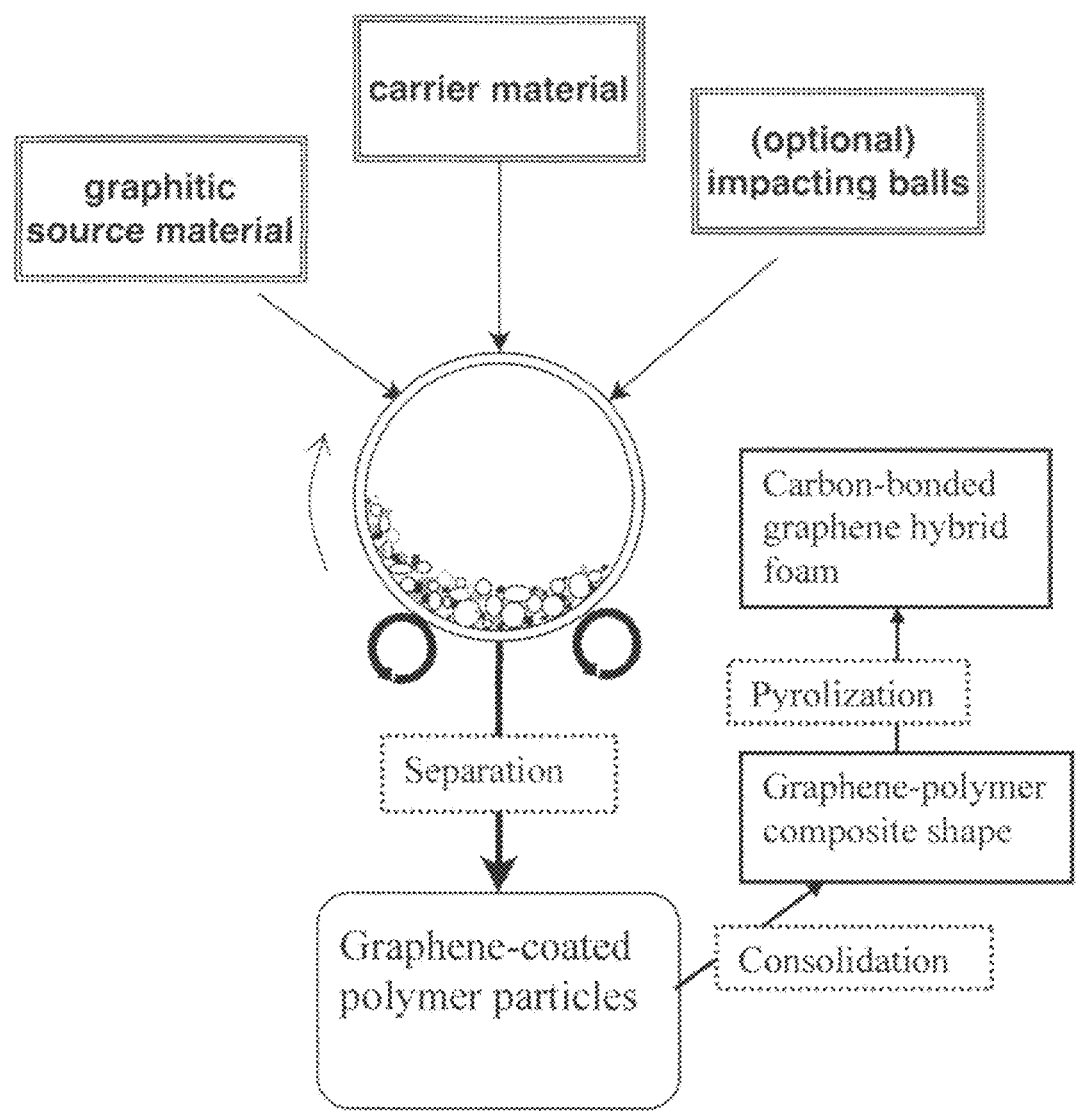
FIG. 2(A) A flow chart showing the presently invented process for producing integral 3D graphene-carbon hybrid foam.

As schematically illustrated in FIG. 2(A), the method begins with mixing multiple particles of a graphitic material and multiple particles of a solid polymer carrier material to form a mixture, which is enclosed in an impacting chamber of an energy impacting apparatus (e.g. a vibratory ball mill, planetary ball mill, high energy mill, basket mill, agitator ball mill, cryo ball mill, micro ball mill, tumbler ball mill, continuous ball mill, stirred ball mill, pressurized ball mill, freezer mill, vibratory sieve, bead mill, nano bead mill, ultrasonic homogenizer mill, centrifugal planetary mixer, vacuum ball mill, or resonant acoustic mixer). When in operation, this energy impacting device imparts kinetic energy to the solid particles contained therein, allowing polymer particles to impinge upon graphite particles with high intensity and high frequency.

In typical operational conditions, such impacting events result in peeling off of graphene sheets from the graphitic material and transferring the graphene sheets to surfaces of the solid polymer carrier particles. These graphene sheets wrap around polymer particles to form graphene-coated or graphene-embedded polymer particles inside the impacting chamber. This is herein referred to as the "direct transfer" process, meaning that graphene sheets are directly transferred from graphite particles to surfaces of polymer particles without being mediated by any third-party entities.

Alternatively, a plurality of impacting balls or media can be added to the impacting chamber of the energy impacting apparatus. These impacting balls, accelerated by the impacting apparatus, impinge upon the surfaces/edges of graphite particles with a high kinetic energy at a favorable angle to peel off graphene sheets from graphite particles. These graphene sheets are tentatively transferred to surfaces of these impacting balls. These graphene-supporting impacting balls subsequently collide with polymer particles and transfer the supported graphene sheets to the surfaces of these polymer particles. This sequence of events is herein referred to as the "indirect transfer" process. These events occur in very high frequency and, hence, most of the polymer particles are covered by graphene sheets typically in less than one hour. In some embodiments of the indirect transfer process, step (c) includes operating a magnet to separate the impacting balls or media from the graphene-coated or graphene-embedded polymer particles.

The method then includes recovering the graphene-coated or graphene-embedded polymer particles from the impacting chamber and consolidating the graphene-coated or graphene-embedded polymer particles into a desired shape of graphene-polymer composite structure. This consolidating step can be as simple as a compacting step that just mechanically packs graphene-coated or embedded particles into a desired shape. Alternatively, this consolidating step can entail melting the polymer particles to form a polymer matrix with graphene sheets dispersed therein. Such a graphene-polymer structure can be in any practical shape or dimensions (fiber, rod, plate, cylinder, or any regular shape or odd shape).

The graphene-polymer compact or composite structure is then pyrolyzed to thermally convert the polymer into carbon or graphite that bonds the graphene sheets to form the integral 3D graphene-carbon hybrid foam.

Figure 2B:
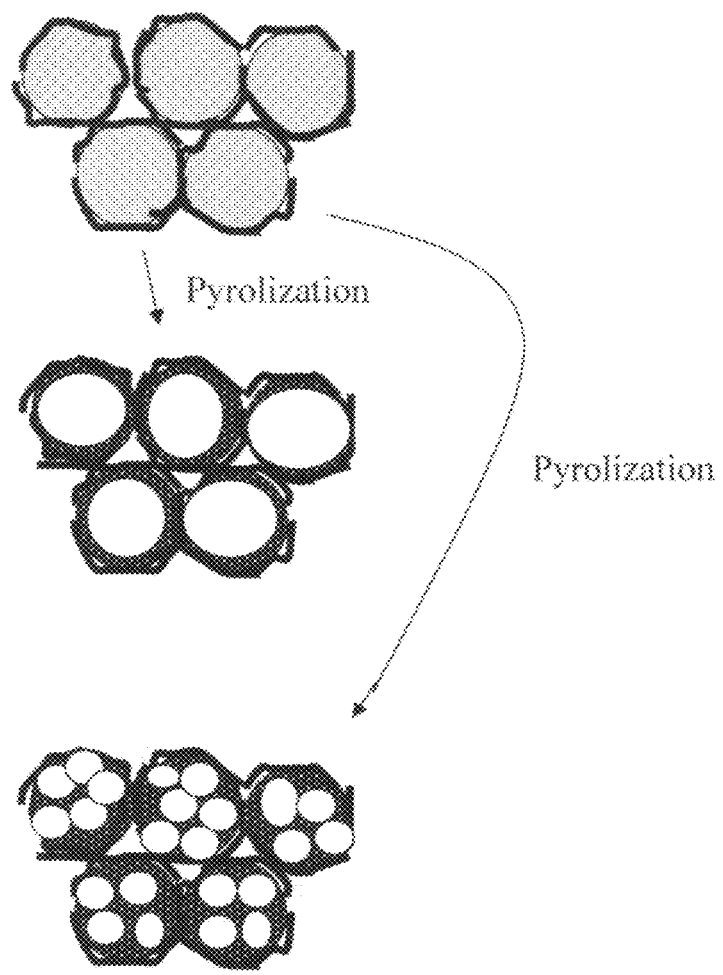
FIG. 2(B) Schematic of the heat-induced conversion of polymer into carbon, which bonds graphene sheets together to form a 3D graphene-carbon hybrid foam. The compacted structure of graphene-coated polymer particles is converted into a highly porous structure.
Figure 3A:
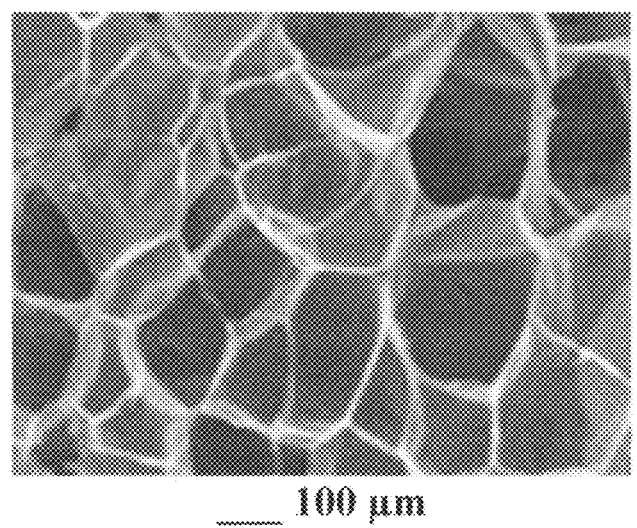
FIG. 3(A) An SEM image of an internal structure of a 3D graphene-carbon hybrid foam.
Figure 3B:
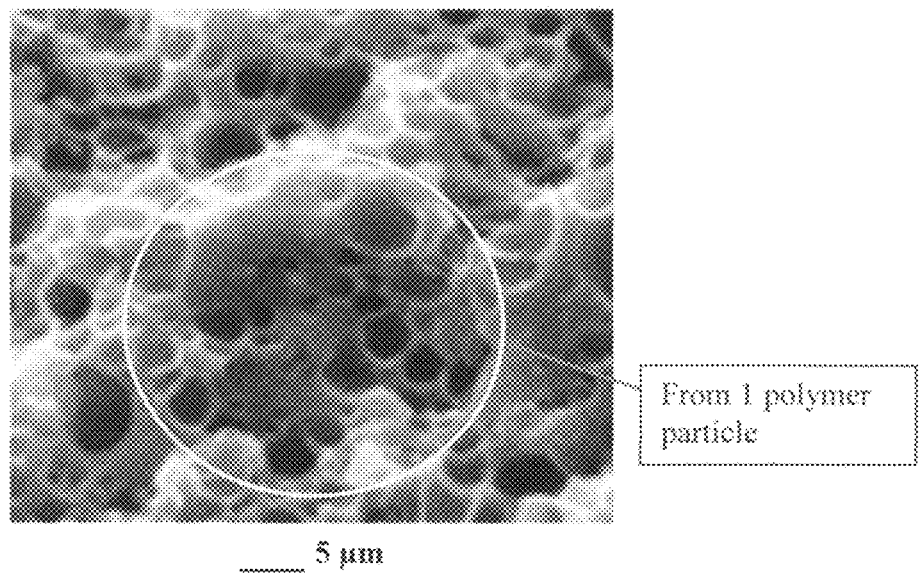
FIG. 3(B) An SEM image of an internal structure of another 3D graphene-carbon hybrid foam FIG. 4(A) Thermal conductivity values vs. specific gravity of a 3D integral graphene-carbon foam produced by the presently invented process, a meso-phase pitch-derived graphite foam, and a Ni foam-template assisted CVD graphene foam.

For the formation of the carbon component of the resulting graphene-carbon hybrid foam, one can choose polymer particles that have a high carbon yield or char yield (e.g. >30% by weight of a polymer being converted to a solid carbon phase; instead of becoming part of a volatile gas). The high carbon-yield polymer may be selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof. When pyrolyzed, particles of these polymers become porous, as illustrated in the bottom portion of FIG. 2(B).

If a lower carbon content (higher graphene proportion relative to carbon proportion) and lower foam density are desired in the graphene-carbon hybrid foam, the polymer can contain a low carbon-yield polymer selected from polyethylene, polypropylene, polybutylene, polyvinyl chloride, polycarbonate, acrylonitrile-butadiene (ABS), polyester, polyvinyl alcohol, poly vinylidiene fluoride (PVDF), polytetrafluoroethylene (PTFE), polyphenylene oxide (PPO), poly methyl methacrylate (PMMA), a copolymer thereof, a polymer blend thereof, or a combination thereof. When pyrolyzed, particles of these polymers become porous, as illustrated in the middle portion of FIG. 2(B).

These polymers (both high and low carbon yields), when heated at a temperature of 300-2,500° C., are converted into a carbon material, which is preferentially nucleated near graphene sheet edges. Such a carbon material naturally bridges the gaps between graphene sheets, forming interconnected electron-conducting pathways. In actuality, the resulting graphene-carbon hybrid foam is composed of integral 3D network of carbon-bonded graphene sheets, enabling continuous transport of electrons and phonons (quantized lattice vibrations) between graphene sheets or domains without interruptions. When further heated at a temperature higher than 2,500° C., the carbon phase can get graphitized to further increase both the electric conductivity and thermal conductivity. The amount of non-carbon elements is also decreased to typically below 1% by weight if the graphitization time exceeds 1 hour.

It may be noted that an organic polymer typically contains a significant amount of non-carbon elements, which can be reduced or eliminated via heat treatments. As such, pyrolyzation of a polymer causes the formation and evolution of volatile gas molecules, such as $CO_2$ and $H_2O$, which lead to the formation of pores in the resulting polymeric carbon phase. However, such pores also have a high tendency to get collapsed if the polymer is not constrained when being carbonized (the carbon structure can shrink while non-carbon elements are being released). We have surprising discovered that the graphene sheets wrapped around a polymer particle are capable of constraining the carbon pore walls from being collapsed. In the meantime, some carbon species also permeate to the gaps between graphene sheets where these species bond the graphene sheets together. The pore sizes and pore volume (porosity level) of the resulting 3D integral graphene foam mainly depend upon the starting polymer size and the carbon yield of the polymer.

The graphitic material, as a source of graphene sheets, may be selected from natural graphite, synthetic graphite, highly oriented pyrolytic graphite, graphite fiber, graphitic nano-fiber, graphite fluoride, oxidized graphite, chemically modified graphite, exfoliated graphite, recompressed exfoliated graphite, expanded graphite, meso-carbon microbead, or a combination thereof. In this regard, there are several additional surprising elements associated with the presently invented method:

(1) Graphene sheets can be peeled off from natural graphite by using polymer particles alone, without utilizing the heavier and harder impacting balls (such as zirconium dioxide or steel balls commonly used in a ball mill, for instance). The peeled-off graphene sheets are directly transferred to polymer particle surfaces and are firmly wrapped around the polymer particles.

(2) It is also surprising that impacting polymer particles are capable of peeling off graphene sheets from artificial graphite, such as meso-carbon micro-beads (MC-MBs), which are known to have a skin layer of amorphous carbon.

(3) With the assistance of harder impacting balls, the graphene-like planes of carbon atoms constituting the internal structure of a carbon or graphite fiber can also be peeled off and transferred to the polymer particle surfaces. This has never been taught or suggested in prior art.

(4) The present invention provides a strikingly simple, fast, scalable, environmentally benign, and cost-effective process that avoids essentially all of the drawbacks associated with prior art processes of producing graphene sheets. The graphene sheets are immediately transferred to and wrapped around the polymer particles, which are then readily converted to integral 3D graphene-carbon hybrid foam.

It may be noted that a certain desired degree of hydrophilicity can be imparted to the pore walls of the graphene-carbon hybrid foam if the starting graphite is intentionally oxidized to some degree (e.g. to contain 2-15% by weight of oxygen). Alternatively, one can attach oxygen-containing functional groups to the carbon phase if the carbonization treatment is allowed to occur in a slightly oxidizing environment. These features enable separation of oil from water by selectively absorbing oil from an oil-water mixture. In other words, such a graphene-carbon hybrid foam material is capable of recovering oil from water, helping to clean up oil-spilled river, lake, or ocean. The oil absorption capacity is typically from 50% to 500% of the foam's own weight. This is a wonderfully useful material for environmental protection purposes.

If a high electrical or thermal conductivity is desired, the graphitic material may be selected from a non-intercalated and non-oxidized graphitic material that has never been previously exposed to a chemical or oxidation treatment prior to being placed into the impacting chamber. Alternatively or additionally, the graphene-carbon foam can be subjected to graphitization treatment at a temperature higher than 2,500° C. The resulting material is particularly useful for thermal management applications (e.g. for use to make a fumed heat sink, a heat exchanger, or a heat spreader.

It may be noted that the graphene-carbon foam may be subjected to compression during and/or after the graphitization treatment. This operation enables us to adjust the graphene sheet orientation and the degree of porosity.

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354\,g+0.344\,(1-g)$, where $d_{002}$ is the interlayer spacing of graphite or graphene crystal in nm. This equation is valid only when $d_{002}$ is equal or less than approximately 0.3440 nm. The graphene foam walls having a $d_{002}$ higher than 0.3440 nm reflects the presence of oxygen- or fluorine-containing functional groups (such as —F, —OH, >O, and —COOH on graphene molecular plane surfaces or edges) that act as a spacer to increase the inter-graphene spacing.

Another structural index that can be used to characterize the degree of ordering of the stacked and bonded graphene planes in the foam walls of graphene and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphene walls have a mosaic spread value in this range of 0.2-0.4 (if produced with a heat treatment temperature (HTT) no less than 2,500° C.). However, some values are in the range of 0.4-0.7 if the HTT is between 1,500 and 2,500° C., and in the range of 0.7-1.0 if the HTT is between 300 and 1,500° C.

In-depth studies using a combination of SEM, TEM, selected area diffraction, X-ray diffraction, AFM, Raman spectroscopy, and FTIR indicate that the graphene foam walls are composed of several huge graphene planes (with length/width typically >>20 nm, more typically >>100 nm, often >>1 µm, and, in many cases, >>10 µm, or even >>100 µm). These giant graphene planes are stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^3$ (weak but existing) electronic configurations, not just the conventional $sp^2$ in graphite.

The integral 3D graphene-carbon hybrid foam is composed of multiple pores and pore walls, wherein the pore walls contain single-layer or few-layer graphene sheets chemically bonded by a carbon material having a carbon material-to-graphene weight ratio from 1/100 to 1/2, wherein the few-layer graphene sheets have 2-10 layers of stacked graphene planes having an inter-plane spacing $d_{002}$ from 0.3354 nm to 0.36 nm as measured by X-ray diffraction and the single-layer or few-layer graphene sheets contain a pristine graphene material having essentially zero % of non-carbon elements, or a non-pristine graphene material having 0.01% to 25% by weight of non-carbon elements (more typically <15%) wherein the non-pristine graphene is selected from graphene oxide, reduced graphene oxide, graphene fluoride, graphene chloride, graphene bromide, graphene iodide, hydrogenated graphene, nitrogenated graphene, chemically functionalized graphene, or a combination thereof. A plurality of single-layer or few layer graphene embracing the underlying polymer particles can overlap with one another to form a stack of graphene sheets. The stack can have a thickness greater than 5 nm and, in some cases, greater than 10 nm or even greater than 100 nm.

The integral 3D graphene-carbon hybrid foam typically has a density from 0.001 to 1.7 g/cm³, a specific surface area from 50 to 3,000 m²/g, a thermal conductivity of at least 200 W/mK per unit of specific gravity, and/or an electrical conductivity no less than 2,000 S/cm per unit of specific gravity. In a preferred embodiment, the pore walls contain stacked graphene planes having an inter-planar spacing $d_{002}$ from 0.3354 nm to 0.40 nm as measured by X-ray diffraction.

Many of the graphene sheets can be merged edge to edge through covalent bonds with one another, into an integrated graphene entity. The gaps between the free ends of those immerged sheets or shorter merged sheets are bonded by the carbon phase converted from a polymer. Due to these unique chemical composition (including oxygen or fluorine content, etc.), morphology, crystal structure (including inter-graphene spacing), and structural features (e.g. degree of orientations, few defects, chemical bonding and no gap between graphene sheets, and substantially no interruptions along graphene plane directions), the graphene-carbon hybrid foam has a unique combination of outstanding thermal conductivity, electrical conductivity, mechanical strength, and stiffness (elastic modulus).

Thermal Management Applications

The aforementioned features and characteristics make the integral 3D graphene-carbon hybrid foam an ideal element for a broad array of engineering and biomedical applications. For instance, for thermal management purposes alone, the graphene-carbon foam can be used in the following applications:
 a) The graphene-carbon hybrid foam, being compressible and of high thermal conductivity, is ideally suited for use as a thermal interface material (TIM) that can be implemented between a heat source and a heat spreader or between a heat source and a heat sink.
 b) The hybrid foam can be used as a heat spreader per se due to its high thermal conductivity.
 c) The hybrid foam can be used as a heat sink or heat dissipating material due to his high heat-spreading capability (high thermal conductivity) and high heat-dissipating capability (large number of surface pores inducing massive air-convection micro or nano channels).
 d) The light weight (low density adjustable between 0.001 and 1.8 g/cm³), high thermal conductivity per unit specific gravity or per unit of physical density, and high structural integrity (graphene sheets being bonded by carbon) make this hybrid foam an ideal material for a durable heat exchanger.

The graphene-carbon hybrid foam-based thermal management or heat dissipating devices include a heat exchanger, a heat sink (e.g. finned heat sink), a heat pipe, high-conductivity insert, thin or thick conductive plate (between a heat sink and a heat source), thermal interface medium (or thermal interface material, TIM), thermoelectric or Peltier cooling plate, etc.

A heat exchanger is a device used to transfer heat between one or more fluids; e.g. a gas and a liquid separately flowing in different channels. The fluids are typically separated by a solid wall to prevent mixing. The presently invented graphene-carbon hybrid foam material is an ideal material for such a wall provided the foam is not a totally open-cell foam that allows for mixing of fluids. The presently invented method enables production of both open-cell and closed-cell foam structures. The high surface pore areas enable dramatically faster exchange of heats between the two or multiple fluids.

Heat exchangers are widely used in refrigeration systems, air conditioning units, heaters, power stations, chemical plants, petrochemical plants, petroleum refineries, natural-gas processing, and sewage treatment. A well-known example of a heat exchanger is found in an internal combustion engine in which a circulating engine coolant flows through radiator coils while air flows past the coils, which cools the coolant and heats the incoming air. The solid walls (e.g. that constitute the radiator coils) are normally made of a high thermal conductivity material, such as Cu and Al. The presently invented graphene foam having either a higher thermal conductivity or higher specific surface area is a superior alternative to Cu and Al, for instance.

There are many types of heat exchangers that are commercially available: shell and tube heat exchanger, plate heat exchangers, plate and shell heat exchanger, adiabatic wheel heat exchanger, plate fin heat exchanger, pillow plate heat exchanger, fluid heat exchangers, waste heat recovery units, dynamic scraped surface heat exchanger, phase-change heat exchangers, direct contact heat exchangers, and microchannel heat exchangers. Every one of these types of heat exchangers can take advantage of the exceptional high thermal conductivity and specific surface area of the presently invented foam material.

The presently invented solid graphene foam can also be used in a heat sink. Heat sinks are widely used in electronic devices for heat dissipation purposes. The central processing unit (CPU) and battery in a portable microelectronic device (such as a notebook computer, tablet, and smart phone) are well-known heat sources. Typically, a metal or graphite object (e.g. Cu foil or graphite foil) is brought into contact with the hot surface and this object helps to spread the heat to an external surface or outside air (primarily by conduction and convection and to a lesser extent by radiation). In most cases, a thin thermal interface material (TIM) mediates between the hot surface of the heat source and a heat spreader or a heat-spreading surface of a heat sink.

A heat sink usually consists of a high-conductivity material structure with one or more flat surfaces to ensure good thermal contact with the components to be cooled, and an array of comb or fin like protrusions to increase the surface contact with the air, and thus the rate of heat dissipation. A heat sink may be used in conjunction with a fan to increase the rate of airflow over the heat sink. A heat sink can have multiple fins (extended or protruded surfaces) to improve heat transfer. In electronic devices with limited amount of space, the shape/arrangement of fins must be optimized such that the heat transfer density is maximized. Alternatively or additionally, cavities (inverted fins) may be embedded in the regions formed between adjacent fins. These cavities are effective in extracting heat from a variety of heat generating bodies to a heat sink.

Typically, an integrated heat sink comprises a heat collection member (core or base) and at least one heat dissipation member (e.g. a fin or multiple fins) integral to the heat collection member (base) to form a finned heat sink. The fins and the core are naturally connected or integrated together into a unified body without using an externally applied adhesive or mechanical fastening means to connect the fins to the core. The heat collection base has a surface in thermal contact with a heat source (e.g. a LED), collects heat from this heat source, and dissipates heat through the fins into the air.

Figure 10:
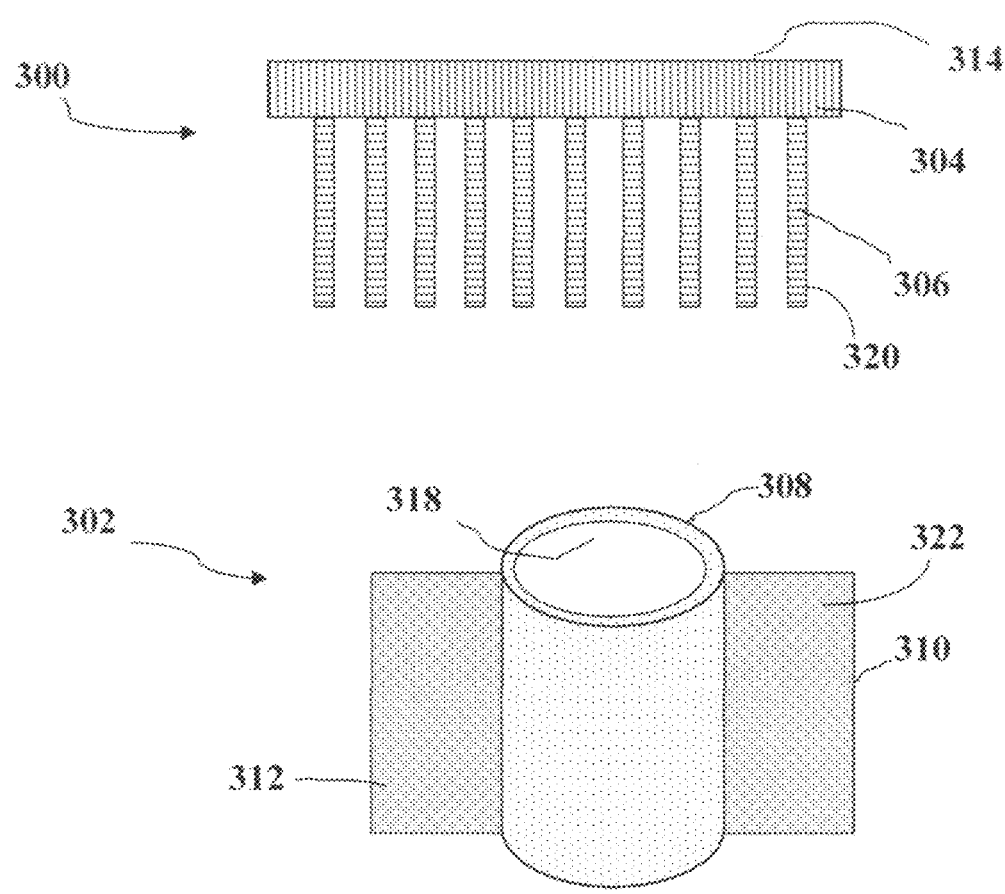
FIG. 10 Schematic of heat sink structures (2 examples).

As illustrative examples, FIG. 10 provides a schematic of two heat sinks: 300 and 302. The first one contains a heat collection member (or base member) 304 and multiple fins or heat dissipation members (e.g. fin 306) connected to the base member 304. The base member 304 is shown to have a heat collection surface 314 intended to be in thermal contact with a heat source. The heat dissipation member or fin 306 is shown to have at least a heat dissipation surface 320.

A particularly useful embodiment is an integrated radial heat sink 302 comprising a radial finned heat sink assembly that comprises: (a) a base 308 comprising a heat collection surface 318; and (b) a plurality of spaced parallel planar fin members (e.g. 310, 312 as two examples) supported by or integral with the base 308, wherein the planar fin members (e.g. 310) comprise the at least one heat dissipation surface 322. Multiple parallel planar fin members are preferably equally spaced.

The presently invented graphene-carbon hybrid foam, being highly elastic and resilient, is itself a good thermal interface material and a highly effective heat spreading element as well. In addition, this high-conductivity foam can also be used as an inserts for electronic cooling and for enhancing the heat removal from small chips to a heat sink. Because the space occupied by high conductivity materials is a major concern, it is a more efficient design to make use of high conductivity pathways that can be embedded into a heat generating body. The elastic and highly conducting solid graphene foam herein disclosed meets these requirements perfectly.

The high elasticity and high thermal conductivity make the presently invented solid graphene-carbon hybrid foam a good conductive thick plate to be placed as a heat transfer interface between a heat source and a cold flowing fluid (or any other heat sink) to improve the cooling performance. In such arrangement, the heat source is cooled under the thick graphene foam plate instead of being cooled in direct contact with the cooling fluid. The thick plate of graphene foam can significantly improve the heat transfer between the heat source and the cooling fluid by way of conducting the heat current in an optimal manner. No additional pumping power and no extra heat transfer surface area are required.

The solid graphene foam is also an outstanding material to construct a heat pipe. A heat pipe is a heat transfer device that uses evaporation and condensation of a two-phase working fluid or coolant to transport large quantities of heat with a very small difference in temperature between the hot and cold interfaces. A conventional heat pipe consists of sealed hollow tube made of a thermally conductive metal such as Cu or Al, and a wick to return the working fluid from the evaporator to the condenser. The pipe contains both saturated liquid and vapor of a working fluid (such as water, methanol or ammonia), all other gases being excluded. However, both Cu and Al are prone to oxidation or corrosion and, hence, their performance degrades relatively fast over time. In contrast, the solid graphene foam is chemically inert and does not have these oxidation or corrosion issues. The heat pipe for electronics thermal management can have a solid graphene foam envelope and wick, with water as the working fluid. Graphene/methanol may be used if the heat pipe needs to operate below the freezing point of water, and graphene/ammonia heat pipes may be used for electronics cooling in space.

Peltier cooling plates operate on the Peltier effect to create a heat flux between the junction of two different conductors of electricity by applying an electric current. This effect is commonly used for cooling electronic components and small instruments. In practice, many such junctions may be arranged in series to increase the effect to the amount of heating or cooling required. The solid graphene foam may be used to improve the heat transfer efficiency.

Filtration and Fluid Absorption Applications

The solid graphene foam can be made to contain microscopic pores (<2 nm) or meso-scaled pores having a pore size from 2 nm to 50 nm. The solid graphene-carbon hybrid foam can also be made to contain micron-scaled pores (1-500 μm). Based on well-controlled pore size alone, the instant graphene-carbon foam can be an exceptional filter material for air or water filtration.

Further, the graphene pore wall chemistry and carbon phase chemistry can be independently controlled to impart different amounts and/or types of functional groups to either or both of the graphene sheets and the carbon binder phase (e.g. as reflected by the percentage of O, F, N, H, etc. in the foam). In other words, the concurrent or independent control of both pore sizes and chemical functional groups at different sites of the internal structure provide unprecedented flexibility or highest degree of freedom in designing and making graphene-carbon hybrid foams that exhibit many unexpected properties, synergistic effects, and some unique combination of properties that are normally considered mutually exclusive (e.g. some part of the structure is hydrophobic and other part hydrophilic; or the foam structure is both hydrophobic and oleophilic). A surface or a material is said to be hydrophobic if water is repelled from this material or surface and that a droplet of water placed on a hydrophobic surface or material will form a large contact angle. A surface or a material is said to be oleophilic if it has a strong affinity for oils and not for water. The present method allows for precise control over hydrophobicity, hydrophilicity, and oleophilicity.

The present invention also provides an oil-removing, oil-separating, or oil-recovering device, which contains the presently invented 3D graphene-carbon hybrid foam as an oil-absorbing or oil-separating element. Also provided is a solvent-removing or solvent-separating device containing the 3D graphene-carbon hybrid foam as a solvent-absorbing element.

A major advantage of using the instant graphene-carbon hybrid foam as an oil-absorbing element is its structural integrity. Due to the notion that graphene sheets are chemically bonded by the carbon material, the resulting foam would not get disintegrated upon repeated oil absorption operations. In contrast, we have discovered that graphene-based oil-absorbing elements prepared by hydrothermal reduction, vacuum-assisted filtration, or freeze-drying get disintegrated after absorbing oil for 2 or 3 times. There is just nothing (other than weak van der Waals forces existing prior to first contact with oil) to hold these otherwise separated graphene sheets together. Once these graphene sheets are wetted by oil, they no longer are able to return to the original shape of the oil-absorbing element.

Another major advantage of the instant technology is the flexibility in designing and making oil-absorbing elements that are capable of absorbing oil up to an amount as high as 400 times of its own weight yet still maintaining its structural shape (without significant expansion). This amount depends upon the specific pore volume of the foam, which can be controlled mainly by the ratio between the amount of original carrier polymer particles and the amount of graphene sheets prior to the heat treatment.

The invention also provides a method to separate/recover oil from an oil-water mixture (e.g. oil-spilled water or waste water from oil sand). The method comprises the steps of (a) providing an oil-absorbing element comprising an integral graphene-carbon hybrid foam; (b) contacting an oil-water mixture with the element, which absorbs the oil from the mixture; and (c) retreating the oil-absorbing element from the mixture and extracting the oil from the element. Preferably, the method comprises a further step of (d) reusing the element.

Additionally, the invention provides a method to separate an organic solvent from a solvent-water mixture or from a multiple-solvent mixture. The method comprises the steps of (a) providing an organic solvent-absorbing element comprising an integral graphene-carbon hybrid foam; (b) bringing the element in contact with an organic solvent-water mixture or a multiple-solvent mixture containing a first solvent and at least a second solvent; (c) allowing this element to absorb the organic solvent from the mixture or absorb the first solvent from the at least second solvent; and (d) retreating the element from the mixture and extracting the organic solvent or first solvent from the element. Preferably, the method contains an additional step (e) of reusing the solvent-absorbing element.

The following examples are used to illustrate some specific details about the best modes of practicing the instant invention and should not be construed as limiting the scope of the invention.

EXAMPLE 1

Production of Graphene-Carbon Foam from Flake Graphite Via Polypropylene Powder-Based Solid Polymer Carrier In an experiment, 1 kg of polypropylene (PP) pellets, 50 grams of flake graphite, 50 mesh (average particle size 0.18 mm; Asbury Carbons, Asbury N.J.) and 250 grams of magnetic steel balls were placed in a high-energy ball mill container. The ball mill was operated at 300 rpm for 2 hours. The container lid was removed and stainless steel balls were removed via a magnet. The polymer carrier material was found to be coated with a dark graphene layer. Carrier material was placed over a 50 mesh sieve and a small amount of unprocessed flake graphite was removed.

A sample of the coated carrier material was then immersed in tetrachloroethylene at 80° C. for 24 hours to dissolve PP and allow graphene sheets to disperse in the organic solvent. After solvent removal, isolated graphene sheet powder was recovered (mostly few-layer graphene). The remaining coated carrier material was then compacted in a mold cavity to form a green compact, which was then heat-treated in a sealed crucible at 350° C. and then at 600° C. for 2 hours to produce a graphene-carbon foam.

In a separate experiment, the same batch of PP pellets and flake graphite particles (without the impacting steel balls) were placed in the same high-energy ball mill container and the ball mill was operated under the same conditions for the same period of time. The results were compared with those obtained from impacting ball-assisted operation. The isolated graphene sheets isolated from PP particles, upon PP dissolution, are mostly single-layer graphene. The graphene-carbon foam produced from this process has a higher level of porosity (lower physical density).

Although polypropylene (PP) is herein used as an example, the carrier material for graphene-carbon hybrid foam production is not limited to PP. It could be any polymer (thermoplastic, thermoset, rubber, wax, mastic, gum, organic resin, etc.) provided the polymer can be made into a particulate form. It may be noted that un-cured or partially cured thermosetting resins (such as epoxide and imide-based oligomers or rubber) can be made into a particle form at room temperature or lower (e.g. cryogenic temperature). Hence, even partially cured thermosetting resin particles can be used as a polymer carrier.

EXAMPLE 2

Graphene-Carbon Hybrid Foam Using Expanded Graphite (>100 nm in Thickness) as the Graphene Source and ABS as the Polymer Solid Carrier Particles In an experiment, 100 grams of ABS pellets, as solid carrier material particles, were placed in a 16 oz plastic container along with 5 grams of expanded graphite. This container was placed in an acoustic mixing unit (Resodyn Acoustic mixer) and processed for 30 minutes. After processing, carrier material was found to be coated with a thin layer of carbon. A small sample of carrier material was placed in acetone and subjected to ultrasound energy to speed dissolution of the ABS. The solution was filtered using an appropriate filter and washed four times with additional acetone. Subsequent to washing, filtrate was dried in a vacuum oven set at 60° C. for 2 hours. This sample was examined by optical microscopy and found to be graphene. The remaining pellets were extruded to create graphene-polymer sheets (1 mm thick), which were then carbonized to prepare graphene-carbon foam samples under different temperature and compression conditions.

EXAMPLE 3

Production of Graphene-Carbon Hybrid Foam from Meso-Carbon Micro Beads (MCMBs as the Graphene Source Material)) and Polyacrylonitrile (PAN) Fibers (as Solid Carrier Particles)

In one example, 100 grams of PAN fiber segments (2 mm long as the carrier particles), 5 grams of MCMBs (China Steel Chemical Co., Taiwan), and 50 grams of zirconia beads were placed in a vibratory ball mill and processed for 2 hours. After the process was completed, the vibratory mill was then opened and the carrier material was found to be coated with a dark coating of graphene sheets. The zirconia particles, having distinctly different sizes and colors were manually removed. The graphene-coated PAN fibers were then compacted and melted together to form several composite films. The films were subjected to a heat treatment at 250° C. for 1 hour (in room air), 350° C. for 2 hours, and 1,000° C. for 2 hours (under an argon gas atmosphere) to obtain graphene-carbon foam layers. Half of the carbonized foam layers were then heated to 2,850° C. and maintained at this temperature for 0.5 hours.

EXAMPLE 4

Particles of Cured Phenolic Resin as the Polymer Carrier in a Freezer Mill

In one experiment, 10 grams of phenolic resin particles were placed in a SPEX mill sample holder (SPEX Sample Prep, Metuchen, N.J.) along with 0.25 grams of HOPG powder derived from graphitized polyimide and a magnetic stainless steel impactor. The same experiment was performed, but the sample holder did not contain any impactor balls. These processes were carried out in a 1%-humidity "dry room" to reduce the condensation of water onto the completed product. The SPEX mill was operated for 10-120 minutes. After operation, the contents of the sample holder were sorted to recover graphene-coated resin particles by removing residual HOPG powder and impactor balls (when used).

The resulting graphene-coated resin particles in both cases (with or without impactor balls) were examined using both digital optical microscopy and scanning electron microscopy (SEM). It was observed that the thickness of the graphene sheets wrapped around resin particles increases with the milling operation time and, given the same duration of operation, the impactor-assisted operation leads to thicker graphene coating.

A mass of graphene-coated resin particles was compressed to form a green compact, which was then infiltrated with a small amount of petroleum pitch. Separately, another green compact of graphene-coated resin particles was prepared under comparable conditions, but no pitch infiltration was attempted. The two compacts were then subjected to identical pyrolysis treatments.

EXAMPLE 5

Natural Graphite Particles as the Graphene Source, Polyethylene (PE) or Nylon 6/6 Beads as the Solid Carrier Particles, and Ceramic or Glass Beads as Added Impacting Balls In an experiment, 0.5 kg of PE or nylon beads (as a solid carrier material), 50 grams of natural graphite (source of graphene sheets) and 250 grams of zirconia powder (impacting balls) were placed in containers of a planetary ball mill. The ball mill was operated at 300 rpm for 4 hours. The container lid was removed and zirconia beads (different sizes and weights than graphene-coated PE beads) were removed through a vibratory screen. The polymer carrier material particles were found to be coated with a dark graphene layer. Carrier material was placed over a 50 mesh sieve and a small amount of unprocessed flake graphite was removed. In a separate experiment, glass beads were used as the impacting balls; other ball-milling operation conditions remained the same.

A mass of graphene-coated PE pellets and a mass of graphene-coated nylon beads were separately compacted in a mold cavity and briefly heated above the melting point of PE or nylon and then rapidly cooled to form two green compacts. For comparison purposes, two corresponding compacts were prepared from a mass of un-coated PE pellets and a mass of un-coated nylon beads. These 4 compacts were then subjected to pyrolyzation (by heating the compacts in a chamber from 100° C. to 650° C.). The results were very surprising. The compacts of graphene-coated polymer particles were found to be converted to graphene-carbon hybrid foam structures having dimensions comparable to the dimensions of the original compacts (3 cm×3 cm×0.5 cm). SEM examination of these structures indicates that carbon phases are present near the edges of graphene sheets and these carbon phases act to bond the graphene sheets together. The carbon-bonded graphene sheets form a skeleton of graphene-carbon hybrid pore walls having pores being present in what used to be the space occupied by the original polymer particles, as schematically illustrated in FIG. 2(A).

In contrast, the two compacts from un-coated pellets or beads shrank to become essentially two solid masses of carbon having a volume approximately 15%-20% of the original compact volumes. These highly shrunk solid masses are practically pore-free carbon materials; they are not a foam material.

EXAMPLES 6

Micron-Sized Rubber Particles as the Solid Polymer Carrier Particles

The experiment began with preparation of micron-sized rubber particles. A mixture of methylhydro dimethyl-siloxane polymer (20 g) and polydimethylsiloxane, vinyldimethyl terminated polymer (30 g) was obtained by using a homogenizer under ambient conditions for 1 minute. Tween 80 (4.6 g) was added and the mixture was homogenized for 20 seconds. Platinum-divinyltetramethyldisiloxane complex (0.5 g in 15 g methanol) was added and mixed for 10 seconds. This mixture was added to 350 g of distilled water and a stable latex was obtained by homogenization for 15 minutes. The latex was heated to 60° C. for 15 hours. The latex was then de-emulsified with anhydrous sodium sulfate (20 g) and the silicone rubber particles were obtained by filtration under a vacuum, washing with distilled water, and drying under vacuum at 25° C. The particle size distribution of the resulting rubber particles was 3-11 µm.

In one example, 10 grams of rubber particles, 2 grams of natural graphite, and 5 grams of zirconia beads were placed in a vibratory ball mill and processed for 2 hours. After the process was completed, the vibratory mill was then opened and the rubber particles were found to be coated with a dark coating of graphene sheets. The zirconia particles were manually removed. The graphene-coated rubber particles were then mixed with 5% by wt. of petroleum pitch (as a binder) and mechanically compacted together to form several composite sheets. The composite sheets were then subjected to a heat treatment at 350° C. for 1 hour, 650° C. for 2 hours, and 1,000° C. for 1 hour in a tube furnace to obtain graphene-carbon foam layers.

EXAMPLES 7

Preparation of Graphene Fluoride Foams

Figure 9:
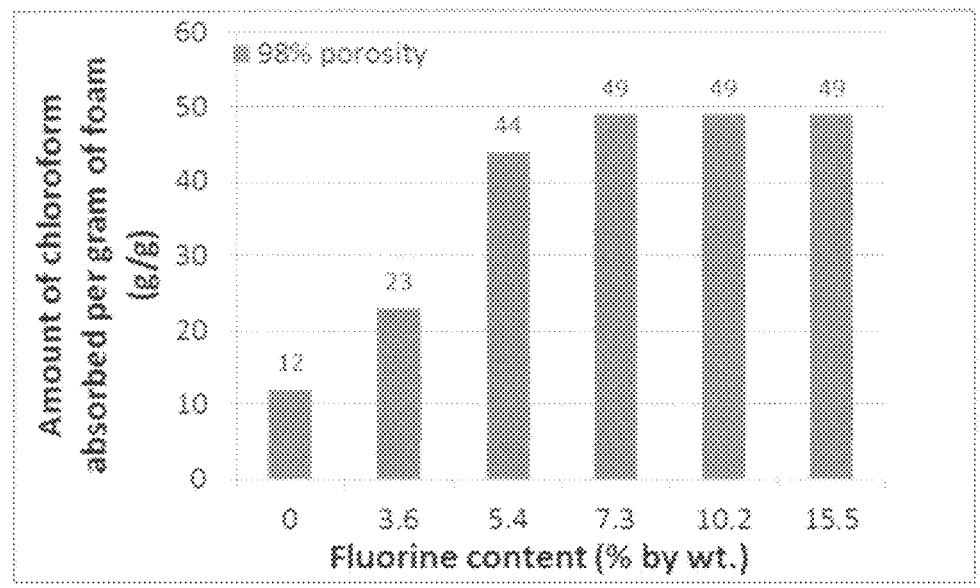
FIG. 9 The amount of chloroform absorbed out of a chloroform-water mixture, plotted as a function of the degree of fluorination.

In a typical procedure, a sheet of graphene-carbon hybrid was fluorinated by vapors of chlorine trifluoride in a sealed autoclave reactor to yield fluorinated graphene-carbon hybrid film. Different durations of fluorination time were allowed for achieving different degrees of fluorination. Sheets of fluorinated graphene-carbon foam were then separately immersed in containers each containing a chloroform-water mixture. We observed that these foam sheets selectively absorb chloroform from water and the amount of chloroform absorbed increases with the degree of fluorination until the fluorine content reaches 7.3% by wt. (FIG. 9)

EXAMPLE 8

Preparation of Graphene Oxide Foam and Nitrogenataed Graphene Foams

Several pieces of graphene-carbon foam prepared in Example 3 were immersed in a 30% $H_2O_2$-water solution for a period of 2-48 hours to obtain graphene oxide (GO) foams, having an oxygen content of 2-25% by weight.

Some GO foam samples were mixed with different proportions of urea and the mixtures were heated in a microwave reactor (900 W) for 0.5 to 5 minutes. The products were washed several times with deionized water and vacuum dried. The products obtained were nitrogenated graphene foam. The nitrogen contents were from 3% to 17.5 wt. %, as measured by elemental analysis.

Figure 7:
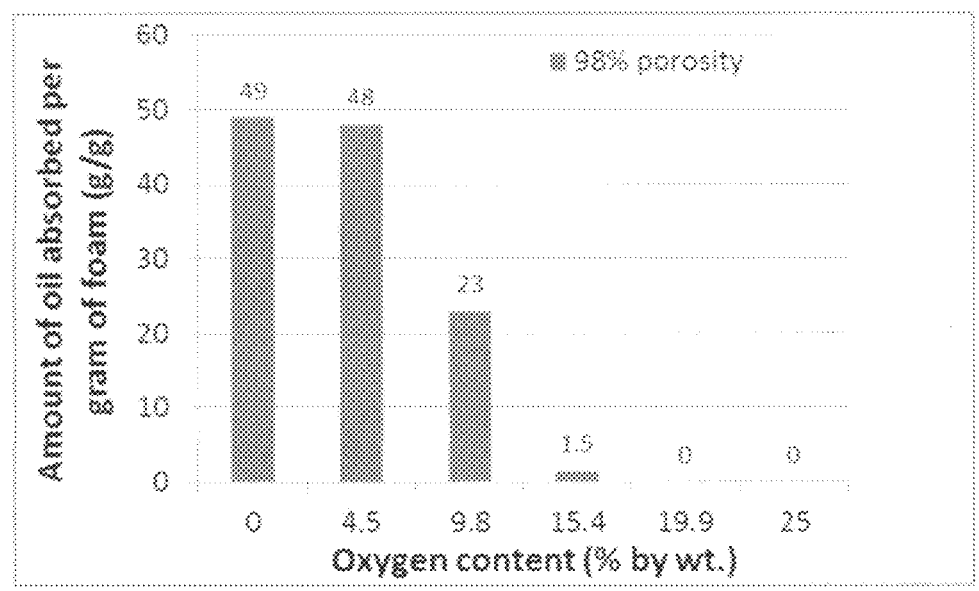
FIG. 7 The amount of oil absorbed per gram of integral 3D graphene-carbon hybrid foam, plotted as a function of the oxygen content in the foam having a porosity level of approximately 98% (oil separation from oil-water mixture).
Figure 8:
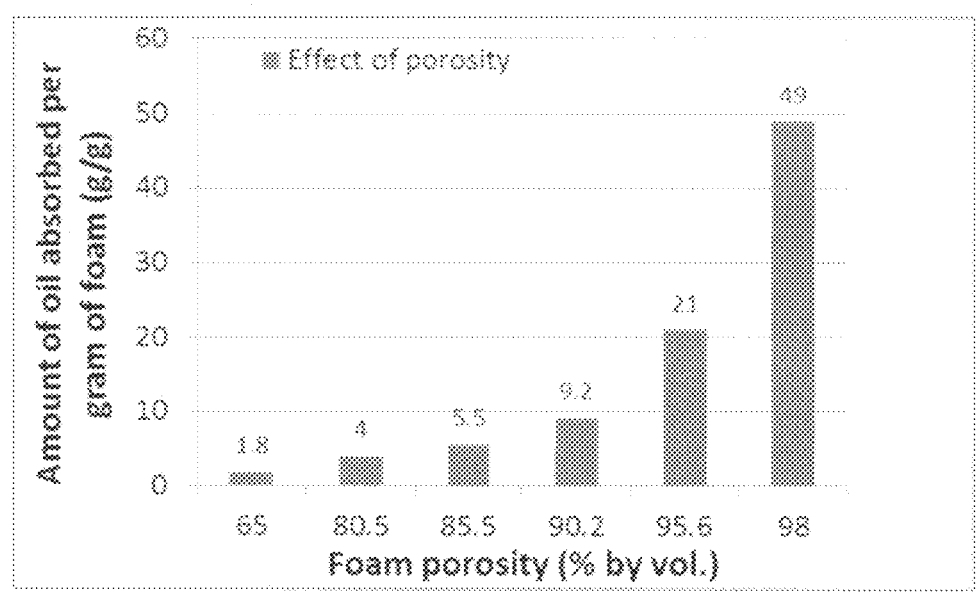
FIG. 8 The amount of oil absorbed per gram of integral 3D graphene-carbon hybrid foam, plotted as a function of the porosity level (given the same oxygen content).

It may be noted that different functionalization treatments of the graphene-carbon hybrid foam were for different purposes. For instance, oxidized graphene-carbon hybrid foam structures are particularly effective as an absorber of oil from an oil-water mixture (i.e. oil spilled on water and then mixed together). In this case, the integral 3D graphene (0-15% by wt. oxygen)-carbon foam structures are both hydrophobic and oleophilic (FIG. 7). A surface or a material is said to be hydrophobic if water is repelled from this material or surface and that a droplet of water placed on a hydrophobic surface or material will form a large contact angle. A surface or a material is said to be oleophilic if it has a strong affinity for oils and not for water.

Different contents of O, F, and/or N also enable the presently invented graphene-carbon hybrid foams to absorb different organic solvents from water, or to separate one organic solvent from a mixture of multiple solvents.

COMPARATIVE EXAMPLE 1

Graphene Via Hummer's Process and Carbonization of Graphene-Polymer Composite

Graphite oxide as prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 A). A sample of this material was subsequently transferred to a furnace pre-set at 650° C. for 4 minutes for exfoliation and heated in an inert atmosphere furnace at 1200° C. for 4 hours to create a low density powder comprised of few-layer reduced graphene oxide (RGO). Surface area was measured via nitrogen adsorption BET. This powder was subsequently dry mixed at a 1%-25% loading level with ABS, PE, PP, and nylon pellets, respectively, and compounded using a 25 mm twin screw extruder to form composite sheets. These composite sheets were then pyrolyzed.

COMPARATIVE EXAMPLE 2

Preparation of Single-Layer Graphene Oxide (GO) Sheets from Meso-Carbon Micro-Beads (MCMBs) and then Production of Graphene Foam Layers from GO Sheets Meso-carbon microbeads (MCMBs) were supplied from China Steel Chemical Co., Kaohsiung, Taiwan. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. Baking soda (5-20% by weight), as a chemical blowing agent, was added to the suspension just prior to casting. The suspension was then cast onto a glass surface. Several samples were cast, some containing a blowing agent and some not. The resulting GO films, after removal of liquid, have a thickness that can be varied from approximately 10 to 500 μm. Several sheets of the GO film, with or without a blowing agent, were then subjected to heat treatments that involve a heat temperature of 80-500° C. for 1-5 hours, which generated a graphene foam structure.

COMPARATIVE EXAMPLE 3

Preparation of Pristine Graphene Foam (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication process (also known as the liquid-phase exfoliation in the art).

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

Various amounts (1%-30% by weight relative to graphene material) of chemical bowing agents (N, N-Dinitroso pentamethylene tetramine or 4. 4'-Oxybis (benzenesulfonyl hydrazide) were added to a suspension containing pristine graphene sheets and a surfactant. The suspension was then cast onto a glass surface. Several samples were cast, including one that was made using $CO_2$ as a physical blowing agent introduced into the suspension just prior to casting. The resulting graphene films, after removal of liquid, have a thickness that can be varied from approximately 10 to 100 μm. The graphene films were then subjected to heat treatments at a temperature of 80-1,500° C. for 1-5 hours, which generated a graphene foam.

COMPARATIVE EXAMPLE 4

CVD Graphene Foams on Ni Foam Templates

The procedure was adapted from that disclosed in open literature: Chen, Z. et al. "Three-dimensional flexible and conductive interconnected graphene networks grown by chemical vapor deposition," Nat. Mater. 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. In order to recover (separate) graphene foam, Ni frame must be etched away. Before etching away the nickel skeleton by a hot HCl (or $FeCl_3$) solution, a thin layer of poly(methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer is critical to preparing a free-standing film of graphene foam; only a severely distorted and deformed graphene foam sample was obtained without the PMMA support layer. This is a tedious process that is not environmentally benign and is not scalable.

COMPARATIVE EXAMPLE 5

Conventional Graphitic Foam from Pitch-Based Carbon Foams

Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon.

COMPARATIVE EXAMPLE 6

Graphene Foams from Hydrothermally Reduced Graphene Oxide

For comparison, a self-assembled graphene hydrogel (SGH) sample was prepared by a one-step hydrothermal method. In a typical procedure, the SGH can be easily prepared by heating 2 mg/mL of homogeneous graphene oxide (GO) aqueous dispersion sealed in a Teflon-lined autoclave at 180° C. for 12 h. The SGH containing about 2.6% (by weight) graphene sheets and 97.4% water has an electrical conductivity of approximately $5 \times 10^{-3}$ S/cm. Upon drying and heat treating at 1,500° C., the resulting graphene foam exhibits an electrical conductivity of approximately $1.5 \times 10^{-1}$ S/cm, which is 2 times lower than those of the presently invented graphene foams produced by heat treating at the same temperature.

EXAMPLE 9

Thermal and Mechanical Testing of Various Graphene Foams and Conventional Graphite Foam Samples from various conventional carbon or graphene foam materials were machined into specimens for measuring the thermal conductivity. The bulk thermal conductivity of meso-phase pitch-derived foam ranged from 67 W/mK to 151 W/mK. The density of the samples was from 0.31-0.61 g/cm$^3$. When weight is taken into account, the specific thermal conductivity of the pitch derived foam is approximately 67/0.31=216 and 151/0.61=247.5 W/mK per specific gravity (or per physical density).

The compression strength of the samples having an average density of 0.51 g/cm$^3$ was measured to be 3.6 MPa and the compression modulus was measured to be 74 MPa. By contrast, the compression strength and compressive modulus of the presently invented graphene-carbon foam samples having a comparable physical density are 6.2 MPa and 113 MPa, respectively.

Figure 4A:
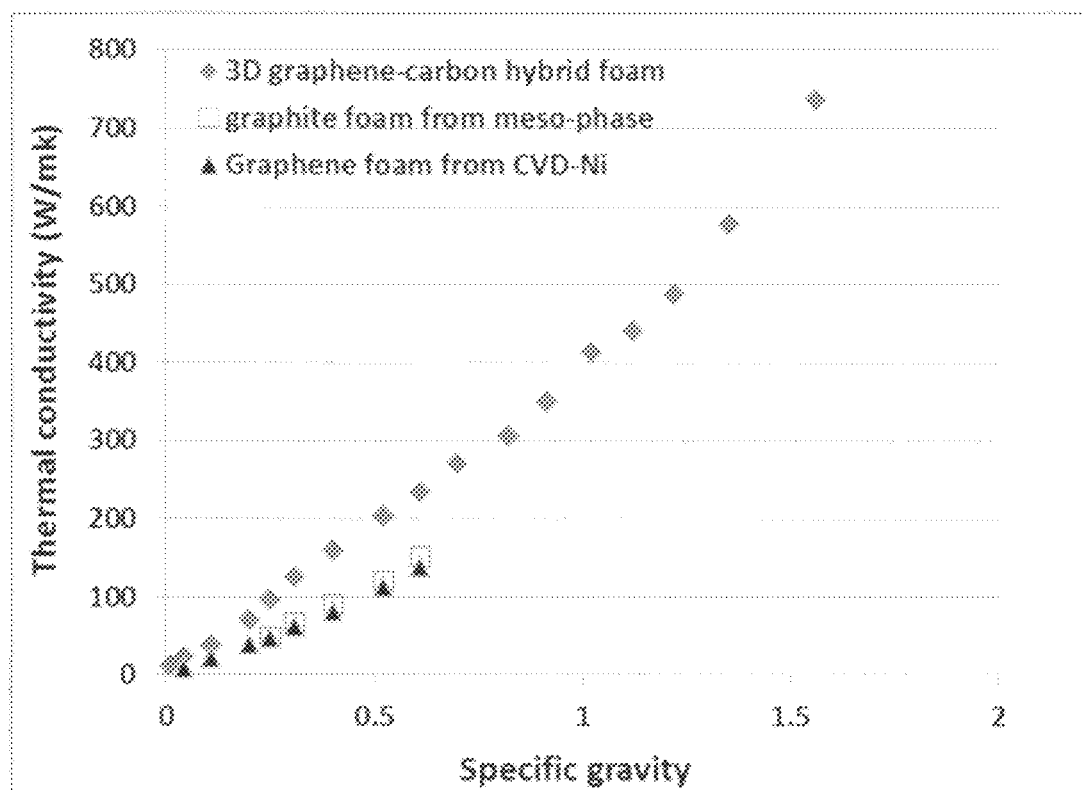
FIG. 4(B) Thermal conductivity values of 3D graphene-carbon foam and the hydrothermally reduced GO graphene foam.
Figure 5:
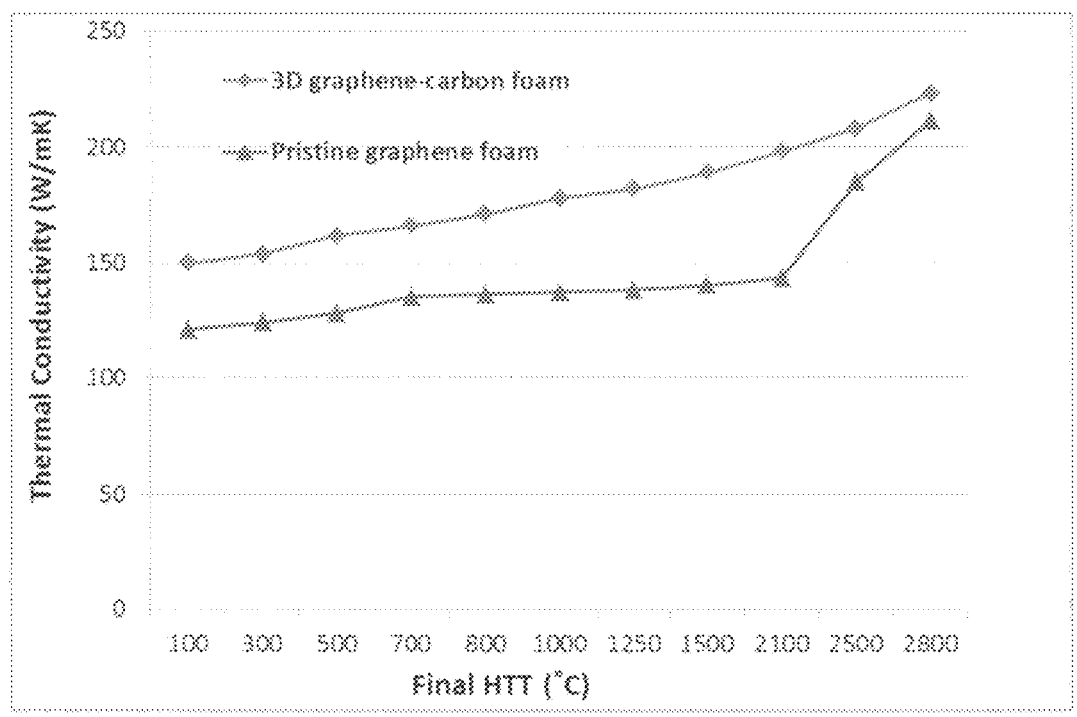
FIG. 5 Thermal conductivity values of 3D graphene-carbon hybrid foam and pristine graphene foam (prepared by casting with a blowing agent and then heat treating) plotted as a function of the final (maximum) heat treatment temperature.

Shown in FIG. 4(A) are the thermal conductivity values vs. specific gravity of the 3D graphene-carbon foam, meso-phase pitch-derived graphite foam, and Ni foam template-assisted CVD graphene foam. These data clearly demonstrate the following unexpected results:
1) The 3D integral graphene-carbon foams produced by the presently invented process exhibit significantly higher thermal conductivity as compared to both meso-phase pitch-derived graphite foam and Ni foam template-assisted CVD graphene, given the same physical density.
2) This is quite surprising in view of the notion that CVD graphene is essentially pristine graphene that has never been exposed to oxidation and should have exhibited a high thermal conductivity compared to our graphene-carbon hybrid foam. The carbon phase of the hybrid foam is in general of low degree of crystallinity (some being amorphous carbon) and, thus, has much lower thermal or electrical conductivity as compared with graphene alone. However, when the carbon phase is coupled with graphene sheets to form an integral structure produced by the presently invented method, the resulting hybrid form exhibits a thermal conductivity as compared to an all-pristine graphene foam. These exceptionally high thermal conductivity values observed with the graphene-carbon hybrid foams herein produced are much to our surprise. This is likely due to the observation that the otherwise isolated graphene sheets are now bonded by a carbon phase, providing a bridge for the uninterrupted transport of electrons and phonons.
3) The specific conductivity values of the presently invented hybrid foam materials exhibit values from 250 to 500 W/mK per unit of specific gravity; but those of other types of foam materials are typically lower than 250 W/mK per unit of specific gravity.
4) Summarized in FIG. 5 are thermal conductivity data for a series of 3D graphene-carbon foams and a series of pristine graphene derived foams, both plotted over the final (maximum) heat treatment temperatures. In both types of materials, the thermal conductivity increases monotonically with the final HTT. However, the presently invented process enables the cost-effective and environmentally benign production of graphene-carbon foams that outperform pristine graphene foams. This is another unexpected result.

Figure 4B:
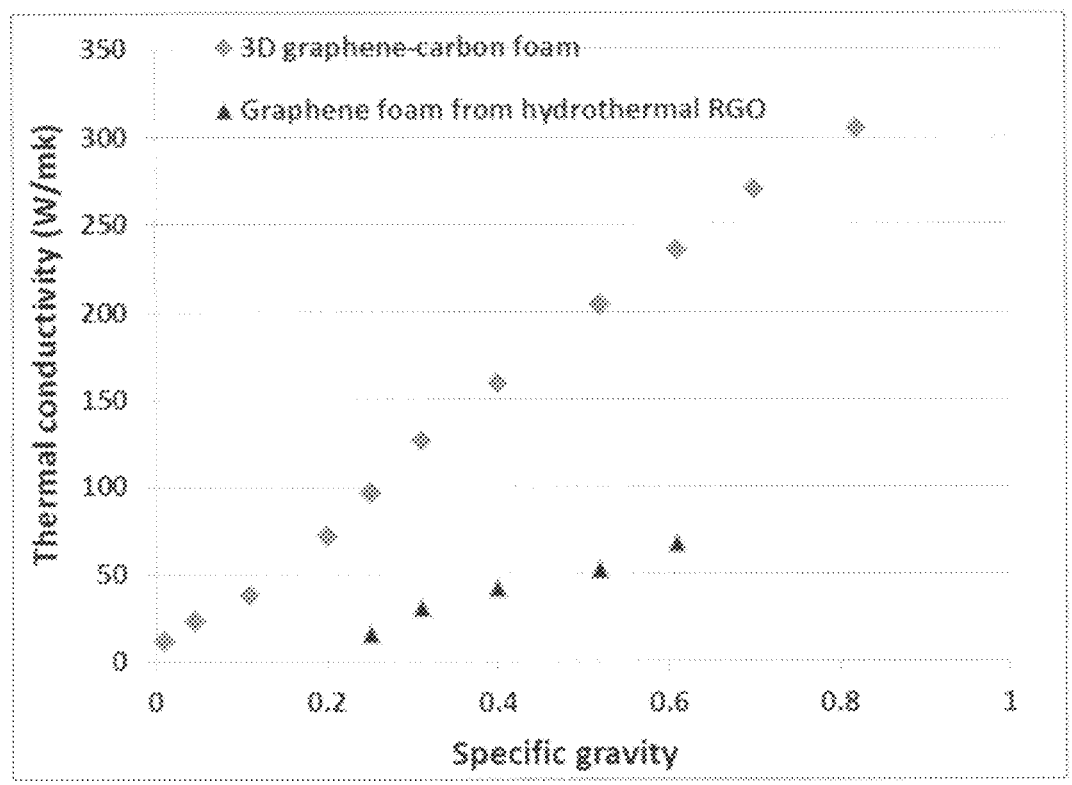
Figure 6:
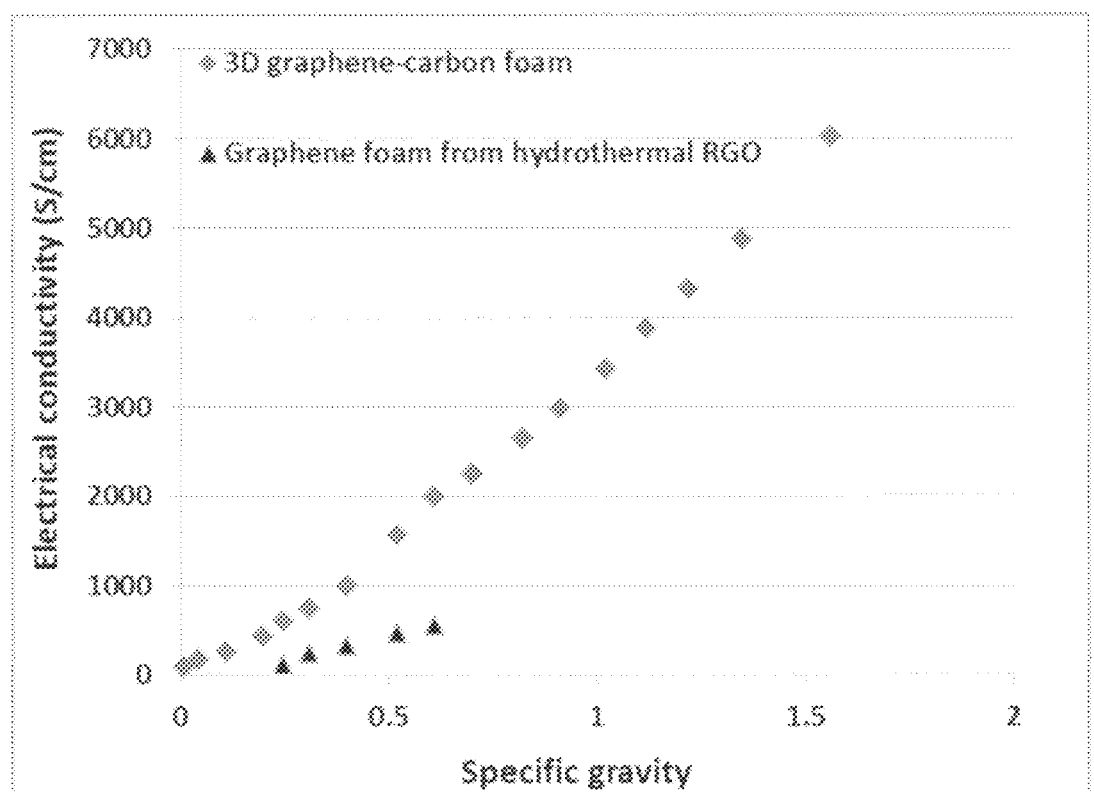
FIG. 6 Electrical conductivity values of 3D graphene-carbon foam and the hydrothermally reduced GO graphene foam.

5) FIG. 4(B) shows the thermal conductivity values of the presently invented hybrid foam and hydrothermally reduced GO graphene foam. Electrical conductivity values of 3D graphene-carbon foam and the hydrothermally reduced GO graphene foam are shown in FIG. 6. These data further support the notion that, given the same amount of solid material, the presently invented graphene-carbon foam is intrinsically most conducting, reflecting the significance of continuity in electron and phonon transport paths. The carbon phase bridges the gaps or interruptions between graphene sheets.

EXAMPLE 10

Characterization of Various Graphene Foams and Conventional Graphite Foam

The internal structures (crystal structure and orientation) of several series of graphene-carbon foam materials were investigated using X-ray diffraction. The X-ray diffraction curve of natural graphite typically exhibits a peak at approximately $2\theta=26°$, corresponds to an inter-graphene spacing ($d_{002}$) of approximately 0.3345 nm. The graphene walls of the hybrid foam materials exhibit a $d_{002}$ spacing typically from 0.3345 nm to 0.40 nm, but more typically up to 0.34 nm.

With a heat treatment temperature of 2,750° C. for the foam structure under compression for one hour, the $d_{002}$ spacing is decreased to approximately to 0.3354 nm, identical to that of a graphite single crystal. In addition, a second diffraction peak with a high intensity appears at $2\theta=55°$ corresponding to X-ray diffraction from (004) plane. The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio <0.1, for all graphitic materials heat treated at a temperature lower than 2,800° C. The I(004)/I(002) ratio for the graphitic materials heat treated at 3,000-3,250° C. (e.g., highly oriented pyrolytic graphite, HOPG) is in the range of 0.2-0.5. In contrast, a graphene foam prepared with a final HTT of 2,750° C. for one hour exhibits a I(004)/I(002) ratio of 0.78 and a Mosaic spread value of 0.21, indicating the pore walls being a practically perfect graphene single crystal with a good degree of preferred orientation (if prepared under a compression force).

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Some of our graphene foams have a mosaic spread value in this range of 0.3-0.6 when produced using a final heat treatment temperature no less than 2,500° C.

The following are a summary of some of the more significant results:
1) In general, the addition of impacting balls helps to accelerate the process of peeling off graphene sheets from graphite particles. However, this option necessitates the separation of these impacting balls after graphene-coated polymer particles are made.
2) When no impacting balls (e.g. ceramic, glass, metal balls, etc.) are used, harder polymer particles (e.g. PE, PP, nylon, ABS, polystyrene, high impact polystyrene, etc. and their filler-reinforced versions) are more capable of peeling off graphene sheets from graphite particles, as compared to softer polymer particles (e.g. rubber, PVC, polyvinyl alcohol, latex particles).
3) Without externally added impacting balls, softer polymer particles tend to result in graphene-coated or embedded particles having 0.001% to 5% by weight of graphene (mostly single-layer graphene sheets) and harder polymer balls tend to lead to graphene-coated particles having 0.01% to 30% by weight of graphene (mostly single-layer and few layer graphene sheets), given the same 1 hour of operating time.
4) With externally added impacting balls, all polymer balls are capable of supporting from 0.001% to approximately 80% by weight of graphene sheets (mostly few-layer graphene, <10 layers, if over 30% by weight of graphene sheets).
5) The presently invented graphene-carbon hybrid foam materials typically exhibit significantly higher structural integrity (e.g. compression strength, elasticity, and resiliency) and higher thermal and electrical conductivities as compared to their counterparts produced by the conventional, prior art methods.
6) It is of significance to point out that all the prior art processes for producing graphite foams or graphene foams appear to provide only macro-porous foams having a physical density in the range of approximately 0.2-0.6 g/cm³, with pore sizes being typically too large (e.g. from 20 to 300 μm) for most of the intended applications. In contrast, the instant invention provides processes that generate graphene foams having a density that can be as low as 0.001 g/cm³ and as high as 1.7 g/cm³. The pore sizes can be varied from microscopic (<2 nm), through meso-scaled (2-50 nm), and up to macro-scaled (e.g. from 1 to 500 μm). This level of flexibility and versatility in designing various types of graphene-carbon foams is unprecedented and un-matched by any prior art process.
7) The presently invented method also allows for convenient and flexible control over the chemical composition (e.g. F, O, and N contents, etc.), responsive to various application needs (e.g. oil recovery from oil-contaminated water, separation of an organic solvent from water or other solvents, heat dissipation, etc.).

In conclusion, we have successfully developed an absolutely new, novel, unexpected, and patently distinct class of highly conducting graphene-carbon hybrid foam materials, devices, and related processes of production. The chemical composition (% of oxygen, fluorine, and other non-carbon elements), structure (crystal perfection, grain size, defect population, etc.), crystal orientation, morphology, process of production, and properties of this new class of foam materials are fundamentally different and patently distinct from meso-phase pitch-derived graphite foam, CVD graphene-derived foam, and graphene foams from hydrothermal reduction of GO.

We claim:

1. A method of producing an integral 3D graphene-carbon hybrid foam directly from a graphitic material, said method comprising:
   (a) mixing multiple particles of a graphitic material and multiple particles of a solid polymer carrier material to form a mixture in an impacting chamber of an energy impacting apparatus;
   (b) operating said energy impacting apparatus with a frequency and an intensity for a length of time sufficient for peeling off graphene sheets from said graphitic material and transferring said graphene sheets to surfaces of said solid polymer carrier material particles to produce graphene-coated or graphene-embedded polymer particles inside said impacting chamber;

(c) recovering said graphene-coated or graphene-embedded polymer particles from said impacting chamber and consolidating said graphene-coated or graphene-embedded polymer particles into a desired shape of graphene-polymer composite structure; and (d) pyrolyzing said shape of graphene-polymer composite structure to thermally convert said polymer into pores and carbon or graphite that bonds said graphene sheets to form said integral 3D graphene-carbon hybrid foam.

2. The method of claim 1, wherein a plurality of impacting balls or media are added to the impacting chamber of said energy impacting apparatus.

3. The method of claim 2, wherein step (c) includes operating a magnet to separate the impacting balls or media from the graphene-coated or graphene-embedded polymer particles.

4. The method of claim 1, wherein said solid polymer material particles include plastic or rubber beads, pellets, spheres, wires, fibers, filaments, discs, ribbons, or rods, having a diameter or thickness from 10 nm to 10 mm.

5. The method of claim 4, wherein said diameter or thickness is from 100 nm to 1 mm.

6. The method of claim 1, wherein said solid polymer is selected from solid particles of a thermoplastic, thermoset resin, rubber, semi-penetrating network polymer, penetrating network polymer, natural polymer, or a combination thereof.

7. The method of claim 1, wherein said solid polymer is partially removed by melting, etching, or dissolving in a solvent prior to step (d).

8. The method of claim 1 wherein said graphitic material is selected from natural graphite, synthetic graphite, highly oriented pyrolytic graphite, graphite fiber, graphitic nanofiber, graphite fluoride, oxidized graphite, chemically modified graphite, exfoliated graphite, recompressed exfoliated graphite, expanded graphite, meso-carbon micro-bead, or a combination thereof.

9. The method of claim 1, wherein the energy impacting apparatus is a vibratory ball mill, planetary ball mill, high energy mill, basket mill, agitator ball mill, cryo ball mill, micro ball mill, tumbler ball mill, continuous ball mill, stirred ball mill, pressurized ball mill, freezer mill, vibratory sieve, bead mill, nano bead mill, ultrasonic homogenizer mill, centrifugal planetary mixer, vacuum ball mill, or resonant acoustic mixer.

10. The method of claim 1, wherein said graphitic material contains a non-intercalated and non-oxidized graphitic material that has never been previously exposed to a chemical or oxidation treatment prior to said mixing step.

11. The method of claim 1, wherein said solid polymer contains a high carbon-yield polymer selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof.

12. The method of claim 1, wherein said solid polymer contains a low carbon-yield polymer selected from polyethylene, polypropylene, polybutylene, polyvinyl chloride, polycarbonate, acrylonitrile-butadiene (ABS), polyester, polyvinyl alcohol, poly vinylidiene fluoride (PVDF), polytetrafluoroethylene (PTFE), polyphenylene oxide (PPO), poly methyl methacrylate (PMMA), a copolymer thereof, a polymer blend thereof, or a combination thereof.

13. The method of claim 1, wherein said step of pyrolyzing includes carbonizing said polymer at a temperature from 200° C. to 2,500° C. to obtain graphene-carbon foam, or carbonizing said polymer at a temperature from 200° C. to 2,500° C. to obtain graphene-carbon foam and then graphitizing said graphene-carbon foam from 2,500° C. to 3,200° C. to obtain graphitized graphene-carbon foam.

14. The method of claim 1, wherein said consolidating step includes melting said polymer particles to form a polymer melt mixture with graphene sheets dispersed therein, forming said polymer melt mixture into a desired shape and solidifying said shape into a graphene-polymer composite structure.

15. The method of claim 1, wherein said consolidating step includes dissolving said polymer particles in a solvent to form a polymer solution mixture with graphene sheets dispersed therein, forming said polymer solution mixture into a desired shape, and removing said solvent to solidify said shape into said graphene-polymer composite structure.

16. The method of claim 1, wherein said consolidating step includes forming said graphene-coated polymer particles into a composite shape selected from a rod, sheet, film, fiber, powder, ingot, or block form.

17. The method of claim 1, wherein said consolidating step includes compacting said graphene-coated polymer particles in a porous green compact having macroscopic pores and then infiltrate or impregnate said pores with an additional carbon source material selected from a petroleum pitch, coal tar pitch, an aromatic organic material, a monomer, an organic polymer, or a combination thereof.

18. The method of claim 17, wherein said organic polymer contains a high carbon-yield polymer selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof.

19. The method of claim 1, wherein said consolidating step includes forming a mass of said graphene-coated or graphene-embedded polymer particles into a compacted object.

20. The method of claim 19, wherein said compacted object is in a form selected from a rod, sheet, film, fiber, powder, ingot, or block.

* * * * *